US012639684B2

(12) United States Patent
Geng et al.

(10) Patent No.: US 12,639,684 B2
(45) Date of Patent: May 26, 2026

(54) STAGING OF NON-FUNGIBLE TOKENS BEFORE DEPLOYMENT

(71) Applicant: Coinbase, Inc., Oakland, CA (US)

(72) Inventors: Sean Geng, Wilmington, NC (US);
Theo Szymkowiak, New York, NY (US)

( * ) Notice: Subject to any disclaimer, the term of this patent is extended or adjusted under 35 U.S.C. 154(b) by 161 days.

(21) Appl. No.: 18/206,995

(22) Filed: Jun. 7, 2023

(65) Prior Publication Data

US 2024/0412185 A1 Dec. 12, 2024

(51) Int. Cl.
*G06Q 20/12* (2012.01)
*H04L 67/1097* (2022.01)

(52) U.S. Cl.
CPC ....... *G06Q 20/123* (2013.01); *H04L 67/1097* (2013.01); *G06Q 2220/00* (2013.01)

(58) Field of Classification Search
CPC .. G06Q 20/123; G06Q 2220/00; G06Q 20/02; G06Q 20/1235; H04L 67/1097
See application file for complete search history.

(56) References Cited

U.S. PATENT DOCUMENTS

| | | | | | |
|---|---|---|---|---|---|
| 2007/0271344 | A1* | 11/2007 | Danasekaran | ......... | G06Q 10/10 709/206 |
| 2010/0281085 | A1* | 11/2010 | Araumi | ................. | G06Q 10/10 707/827 |
| 2023/0045080 | A1* | 2/2023 | Marks | ....................... | H04L 9/50 |
| 2023/0108366 | A1* | 4/2023 | Tang | ................. | G06Q 20/3829 705/66 |
| 2023/0222187 | A1* | 7/2023 | Goldston | .............. | G06F 16/686 726/28 |
| 2023/0222467 | A1* | 7/2023 | Wang | ..................... | G06Q 30/06 705/71 |
| 2023/0274244 | A1* | 8/2023 | Quigley | ................ | G06F 21/602 705/65 |
| 2023/0281604 | A1* | 9/2023 | Robell | ................. | G06Q 30/018 |
| 2023/0306390 | A1* | 9/2023 | Ahmed | ..................... | H04L 9/50 |
| 2023/0360300 | A1* | 11/2023 | De Brouwer | ........ | G06Q 50/184 |
| 2024/0177145 | A1* | 5/2024 | Miele | ..................... | G06Q 30/01 |
| 2024/0202721 | A1* | 6/2024 | Hu | ........................ | G06Q 20/401 |
| 2025/0233752 | A1* | 7/2025 | Kobayashi | ........... | H04L 9/3213 |

FOREIGN PATENT DOCUMENTS

| | | | | | |
|---|---|---|---|---|---|
| CN | 105229683 B | * | 6/2020 | ............. | G06Q 20/20 |
| WO | WO-2023080273 A1 | * | 5/2023 | ........... | H04N 21/478 |

* cited by examiner

*Primary Examiner* — Chunling Ding
(74) *Attorney, Agent, or Firm* — Holland & Hart LLP

(57) ABSTRACT

Methods, systems, and devices for staging of non-fungible tokens (NFTs) before deployment of the NFTs are described. A custodial token platform receives user inputs corresponding to a collection of NFTs associated with a smart contract to be stored on a blockchain distributed data store. The custodial token platform deploys the smart contract to the blockchain distributed data store based on the user inputs, receives data corresponding to the collection, and uploads the data corresponding to the collection to a distributed file system. Uploading the data corresponding to the collection includes uploading first content for a first NFT and uploading second content for a second NFT to the distributed file system. The custodial token platform receives an update to the first content, uploads the updated first content to the distributed file system, and updates the smart contract to include indications of the data corresponding to the collection and the updated first content.

19 Claims, 14 Drawing Sheets

410

400

510
Describe your collection
What is your collection type?
ERC-721
Every NFT in your collection is one-of-a kind, such as 100 unique images
ERC-1155
Some NFTs are the same. For example, 5 image with 20 copies each
Who will mint your NFTs?
I'll mint myself
You'll pay the network fee for each NFT
My community will mint
Your buyers will pay the network fees
540
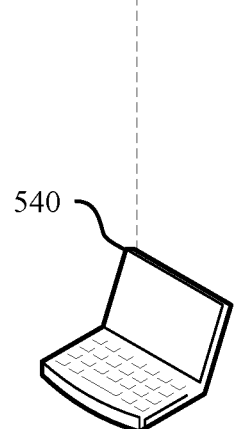
500
FIG. 5

610

640

600

Figure 8:
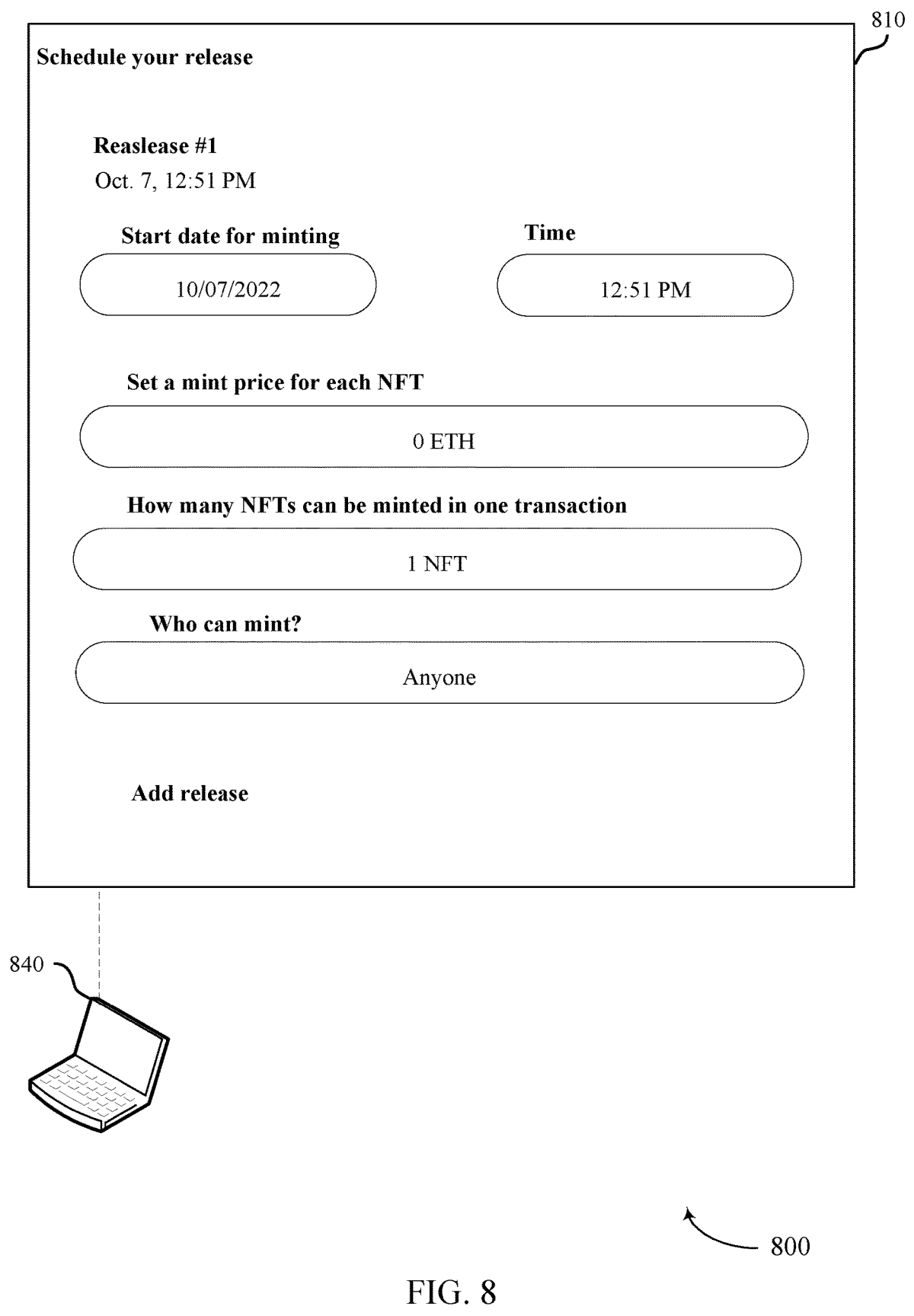

Schedule your release

Reaslease #1
Oct. 7, 12:51 PM

Start date for minting

10/07/2022

Time

12:51 PM

Set a mint price for each NFT

0 ETH

How many NFTs can be minted in one transaction

1 NFT

Who can mint?

Anyone

Add release

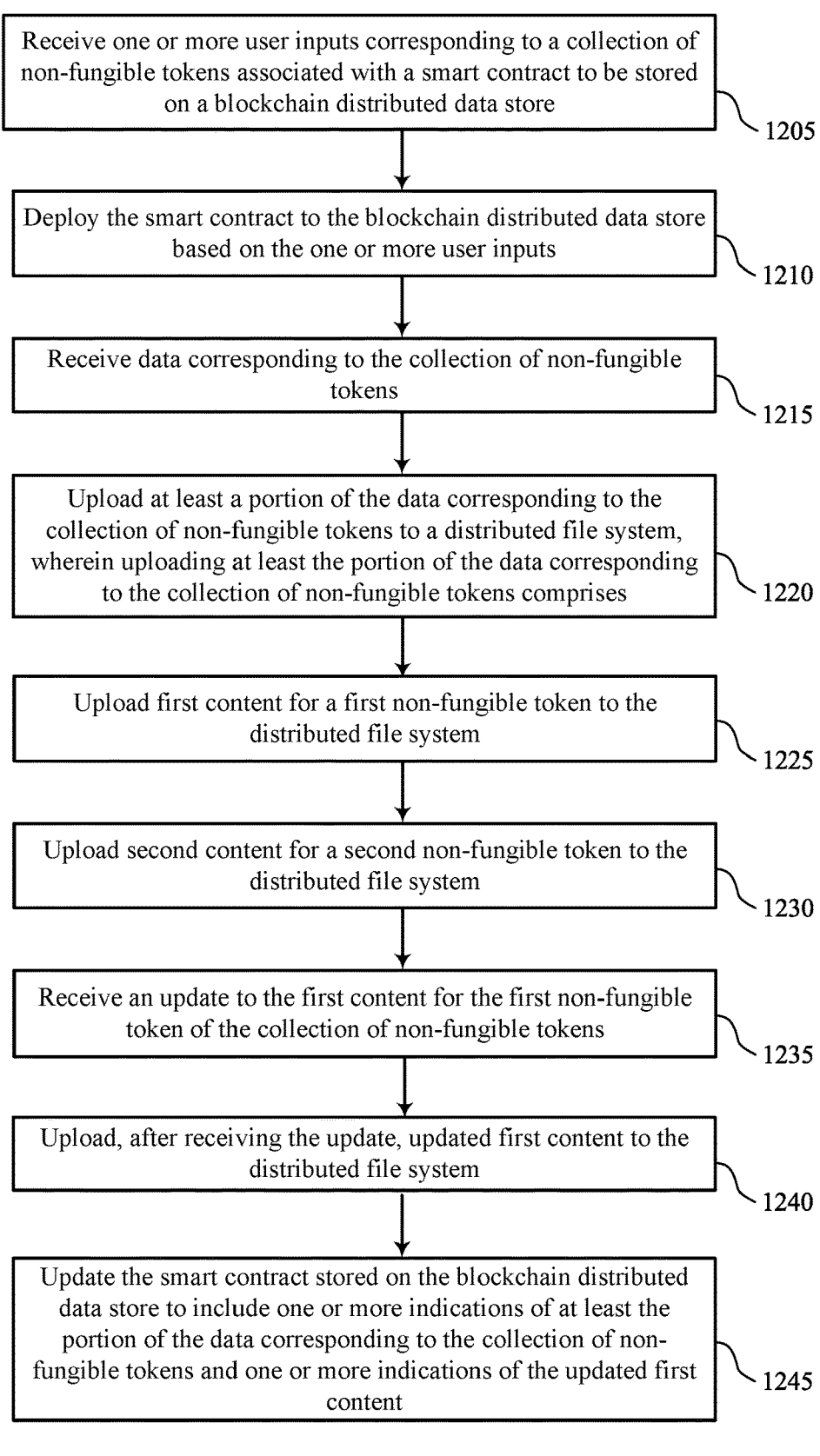

Receive one or more user inputs corresponding to a collection of non-fungible tokens associated with a smart contract to be stored on a blockchain distributed data store

1205

Deploy the smart contract to the blockchain distributed data store based on the one or more user inputs

1210

Receive data corresponding to the collection of non-fungible tokens

1215

Upload at least a portion of the data corresponding to the collection of non-fungible tokens to a distributed file system, wherein uploading at least the portion of the data corresponding to the collection of non-fungible tokens comprises

1220

Upload first content for a first non-fungible token to the distributed file system

1225

Upload second content for a second non-fungible token to the distributed file system

1230

Receive an update to the first content for the first non-fungible token of the collection of non-fungible tokens

1235

Upload, after receiving the update, updated first content to the distributed file system

1240

Update the smart contract stored on the blockchain distributed data store to include one or more indications of at least the portion of the data corresponding to the collection of non-fungible tokens and one or more indications of the updated first content

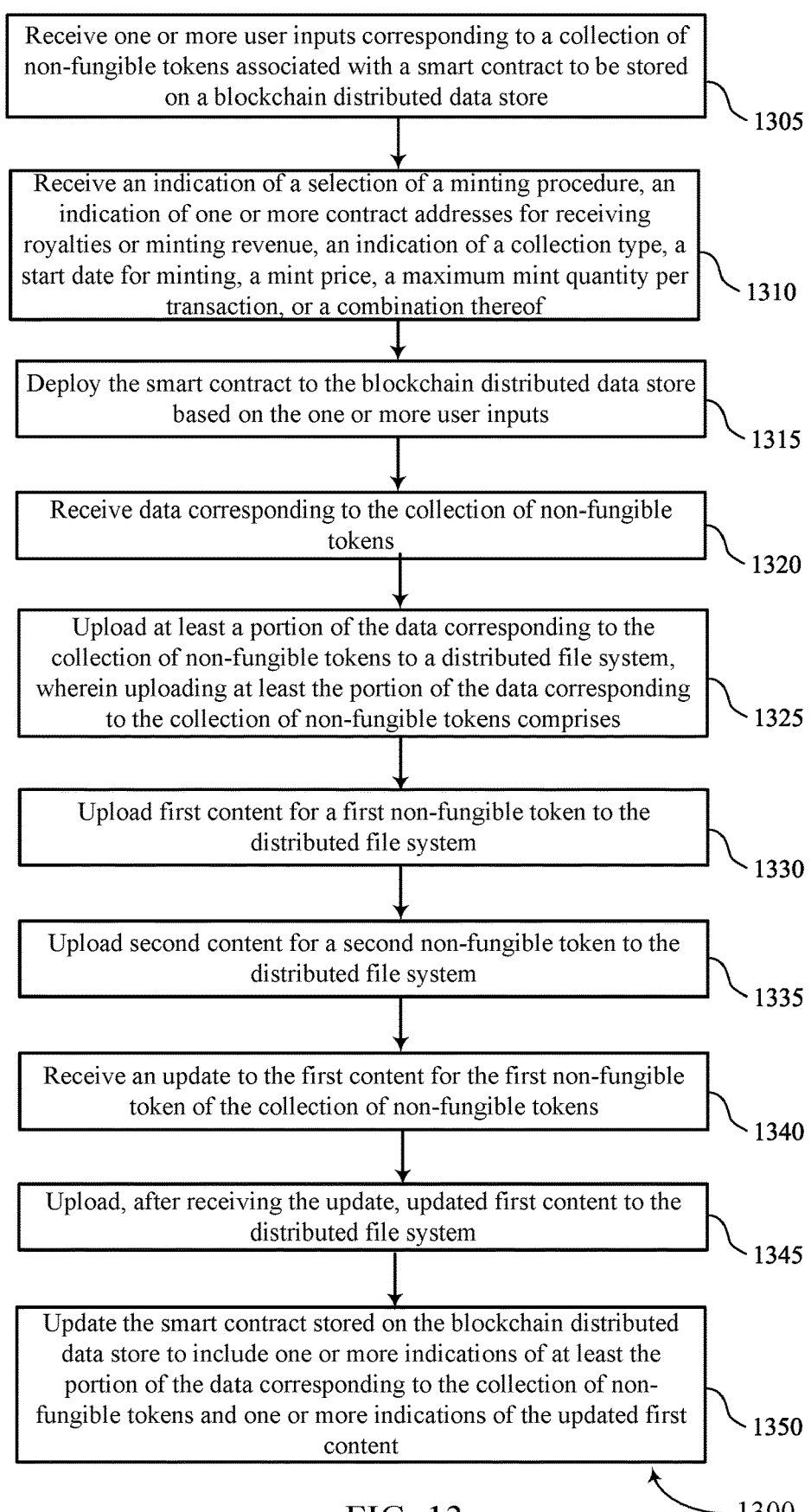

Receive one or more user inputs corresponding to a collection of non-fungible tokens associated with a smart contract to be stored on a blockchain distributed data store

1305

Receive an indication of a selection of a minting procedure, an indication of one or more contract addresses for receiving royalties or minting revenue, an indication of a collection type, a start date for minting, a mint price, a maximum mint quantity per transaction, or a combination thereof

1310

Deploy the smart contract to the blockchain distributed data store based on the one or more user inputs

1315

Receive data corresponding to the collection of non-fungible tokens

1320

Upload at least a portion of the data corresponding to the collection of non-fungible tokens to a distributed file system, wherein uploading at least the portion of the data corresponding to the collection of non-fungible tokens comprises

1325

Upload first content for a first non-fungible token to the distributed file system

1330

Upload second content for a second non-fungible token to the distributed file system

1335

Receive an update to the first content for the first non-fungible token of the collection of non-fungible tokens

1340

Upload, after receiving the update, updated first content to the distributed file system

1345

Update the smart contract stored on the blockchain distributed data store to include one or more indications of at least the portion of the data corresponding to the collection of non-fungible tokens and one or more indications of the updated first content

STAGING OF NON-FUNGIBLE TOKENS BEFORE DEPLOYMENT

FIELD OF TECHNOLOGY

The present disclosure relates generally to data management, including techniques for staging of non-fungible tokens before deployment.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

BRIEF DESCRIPTION OF THE DRAWINGS

FIG. 5 shows an example of an input of descriptions for a collection of NFTs that supports staging of NFTs before deployment in accordance with aspects of the present disclosure.

FIG. 8 shows an example of a setting minting details for the collection of NFTs that supports staging of NFTs before deployment in accordance with aspects of the present disclosure.

FIGS. 12 through 14 show flowcharts illustrating methods that support staging of non-fungible tokens before deployment in accordance with aspects of the present disclosure.

DETAILED DESCRIPTION

Figure 1:
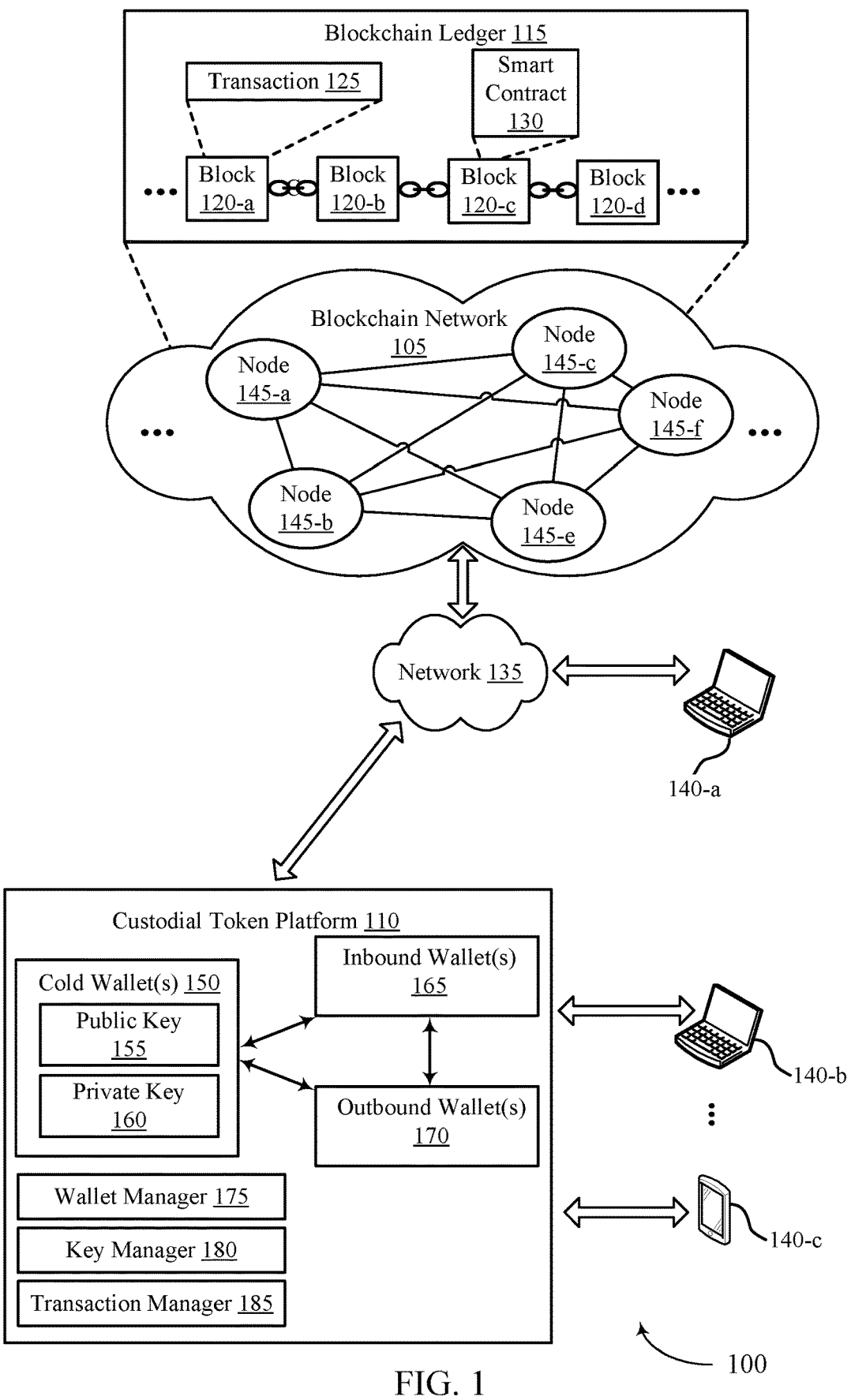
FIG. 1 illustrates an example of a computing environment that supports staging of non-fungible tokens before deployment in accordance with aspects of the present disclosure.

A non-fungible token (NFT) is a unique digital asset or a digital identifier that is recorded on a blockchain and is used to certify ownership and authenticity. In particular, an NFT is a data file, stored on a type of digital ledger called the blockchain, and may be sold and traded. The NFT may be associated with, represent, or include a particular asset, such as a digital asset or a physical asset, such as an image, art, music, video recording, audio recording, and other digital or physical mediums. For example, the NFT may be associated with avatars or virtual real estate. NFTs are generally purchased and sold online, often with cryptocurrency, and they are generally encoded with the same underlying software as many cryptocurrencies. The ownership of an NFT is recorded on the blockchain and may be transferred by the owner, which facilitates selling and trading the NFTs, similar to cryptocurrencies. Physical currency and cryptocurrency are fungible, such that that they may be traded or exchanged for one another. NFTs are non-fungible, such that they can neither be replaced nor interchanged because they have unique properties. Since each NFT is distinct, the NFTs have different values and can be used to establish proof of ownership for a digital asset.

In order to purchase, sell, or trade an NFT, the NFT may be minted, which refers to publishing a unique digital asset on the blockchain. A user creating an NFT can deploy a smart contract associated with the NFT to a blockchain and deploy the NFT using the deployed smart contract. Additionally, or alternatively, the user may use an existing smart contract to deploy the NFT. The NFTs may be listed on one or multiple marketplaces for sale. Deploying the associated smart contract may be associated with a gas fee. After deploying the smart contract, the NFT may be minted to the blockchain, so that it may be purchased, sold, or traded. NFT minting is also associated with another gas fee. The minting fee may be paid by the user creating and publishing the NFT (creating user) or the user purchasing the NFT (purchasing user) at the time that the NFT is purchased. In some examples, after deploying the smart contract to the blockchain and subsequently minting, the creating user may no longer make any changes to the NFT without incurring additional gas fees. That is, the user may no longer modify the data (e.g., image or description). Accordingly, if the user wants to make a modification to the NFT, the user may create a new NFT and deploy a new smart contract to the blockchain and pay a new deployment fee. Moreover, if the NFT has been minted, then the user may also pay a new minting fee for the new NFT.

In some examples, the creating user may generate data that corresponds to the NFT before deploying the smart contract to the blockchain. The data may be stored on a distributed file system. The creating user may generate the data after creating the NFT. If the creating user wants to make modifications to an existing NFT and thus, creates a new NFT, the user may also generate new corresponding data for the new NFT and reupload data to the distributed file system.

Techniques described herein facilitate staging of NFTs before deployment or publishing of the NFTs to the blockchain. As discussed herein, staging may provide a draft mode or an editing mode before deploying the collection of NFTs to the blockchain. A custodial token platform (e.g., via one or more servers) may receive user inputs corresponding to a collection of NFTs associated with a smart contract to be stored on a blockchain distributed data store. The custodial token platform may deploy the smart contract to the blockchain distributed data store based on the user inputs, receive data corresponding to the collection of NFTs, and upload the data corresponding to the collection of NFTs to a distributed file system. Uploading the data corresponding to the collection of NFTs includes uploading first content for a first NFT to the distributed file system and uploading second content for a second NFT to the distributed file system. The custodial token platform may receive an update to the first content (e.g., modification to an NFT), upload the updated first content to the distributed file system after receiving the update, and update the smart contract to include indications of the data corresponding to the collection of NFTs and the updated first content. This technique of staging the NFTs before deployment may result in more flexibility in modifying a NFTs before deploying the NFTs to the blockchain, as well reduce costs otherwise associated with deploying new smart contracts and minting new NFTs. This technique of staging the NFTs may also facilitate efficiently updating the smart contract in the background as the data corresponding to the collection of NFTs in the distributed file system is updated as the collection of NFTs is updated.

FIG. 1 illustrates an example of a computing environment 100 that supports staging of NFTs before deployment in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 (e.g., nodes 145-a, 145-b, 145-c, 145-d, 145-e, and 145-f) of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, NFTs (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-a, 120-b, 120-c, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-a, 140-b, or 140-c) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-d) of a blockchain ledger (e.g., the blockchain ledger 115) of transactions after verification of the transaction. Using the implemented consensus mechanism, each node 145 may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a subprogram that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the computing system custodial token platform 110, the blockchain network 105, or both. For example, a user of the computing device 140-a may provide user inputs via the computing device 140-a, which may result in commands, data, or any combination thereof being communicated via the network 135 to the computing system custodial token platform 110, the blockchain network 105, or both. Additionally, or alternatively, a computing device 140-a may output (e.g., display) data or other information received from the custodial token platform 110, the blockchain network 105, or both. A user of a computing device 140-a may, for example, use the computing device 140-a to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, for example, using a smart contract 130 or a decentralized application ("Dapp"). The smart contract 130 or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital asset between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170) may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to cause transfer of tokens from a wallet managed by the custodial token platform 110 to an external wallet, to deploy a smart contract (e.g., a self-executing program), or to call a smart contract.

Additionally, a user may access the custodial token platform 110 via a custodial application to purchase, sell, exchange, or trade digital assets, such as NFTs, crypto tokens, or the like. In some examples, the custodial token platform 110 supports staging of NFTs before deployment of the NFTs to the blockchain ledger 115. As described herein, the term "staging" refers to a draft mode or an editing mode that occurs in between deployment of the smart contract 130 to the blockchain ledger 115 and minting the NFTs to deploy or publish the NFTs to the blockchain ledger 115. The draft mode allows the user that created the collection of NFTs (creating user) to modify NFT-related data. Staging may also include a corresponding staging interface via the device 140, where the creating user may input the modifications. As described herein, the term "lazy minting" refers to a process in which the creating user does not pay the fee for minting the collection of NFTs, and the creating user may publish the NFT sale via a primary sell (e.g., a mint). As described herein, the term "sale" refers to a primary sale or a secondary sale. A "primary sale" refers to an NFT available for an initial sale or minting. A "secondary sale" refers to an NFT that has already been minted or pre-owned, and that can be resold via an NFT marketplace, transferred, to other wallets, or the like. The techniques described herein may be applicable to the primary sale or minting of the NFT. The collection of NFTs may be minted when a user purchasing the collection of NFTs (purchasing user) purchases the collection of NFTs, and the cost of minting is added to the total cost of the collection of NFTs for the purchasing user. In some examples, staging may occur before the lazy minting process.

A user may create a collection of NFTs (e.g., one or more NFTs), and a smart contract 130 for the collection of NFTs may be deployed to the blockchain ledger 115. The creating user may pay a fee for deploying the smart contract 130 to the blockchain ledger 115, as well as the fee for minting the collection of NFTs. In some cases, such as a lazy minting case, the creating user may choose for the purchasing user to pay the minting fee. In either case, after deploying the smart contract 130 to the blockchain ledger 115 or after publishing the NFTs to the smart contract 130, the creating user may be unable to make changes to the NFTs (e.g., modifying the image of one or more of the NFTs, descriptions associated with one or more of the images, and other NFT-related data).

Techniques described herein address the forgoing by supporting a staging of NFTs before publishing of the NFTs to the blockchain. For example, after the smart contract 130 has been deployed and prior to minting, the creating user may enter staging, where the collection of NFTs may be modified or edited. For example, descriptions, images, and other NFT-related data may be modified (e.g., updated, removed, or added) during staging. The smart contract 130 may be updated after the data is modified so that the NFT-related data is efficiently updated as intended prior to minting. In this manner, fees associated with redeployment of a new smart contract 130 for new NFTs or new minting fees may be mitigated or avoided. Additionally, these techniques limit or reduce wasteful utilization of computing resources (e.g., processor and memory resources of blockchain nodes 145 or distributed file system nodes) due to use of these resources by NFTs with errors. To update the smart contract 130 according to the changes made during the staging, the custodial token platform 110 may track the changes and store them on a distributed file system before the smart contract 130 is updated. Accordingly, uploading new data indicative of the changes to the distributed file system after the staging, may be avoided, saving time otherwise spent uploading the new data. The staging described herein is described with respect to the custodial token platform 110, but it should be understood that the staging may be performed by other services supported by one or more servers.

Figure 2:
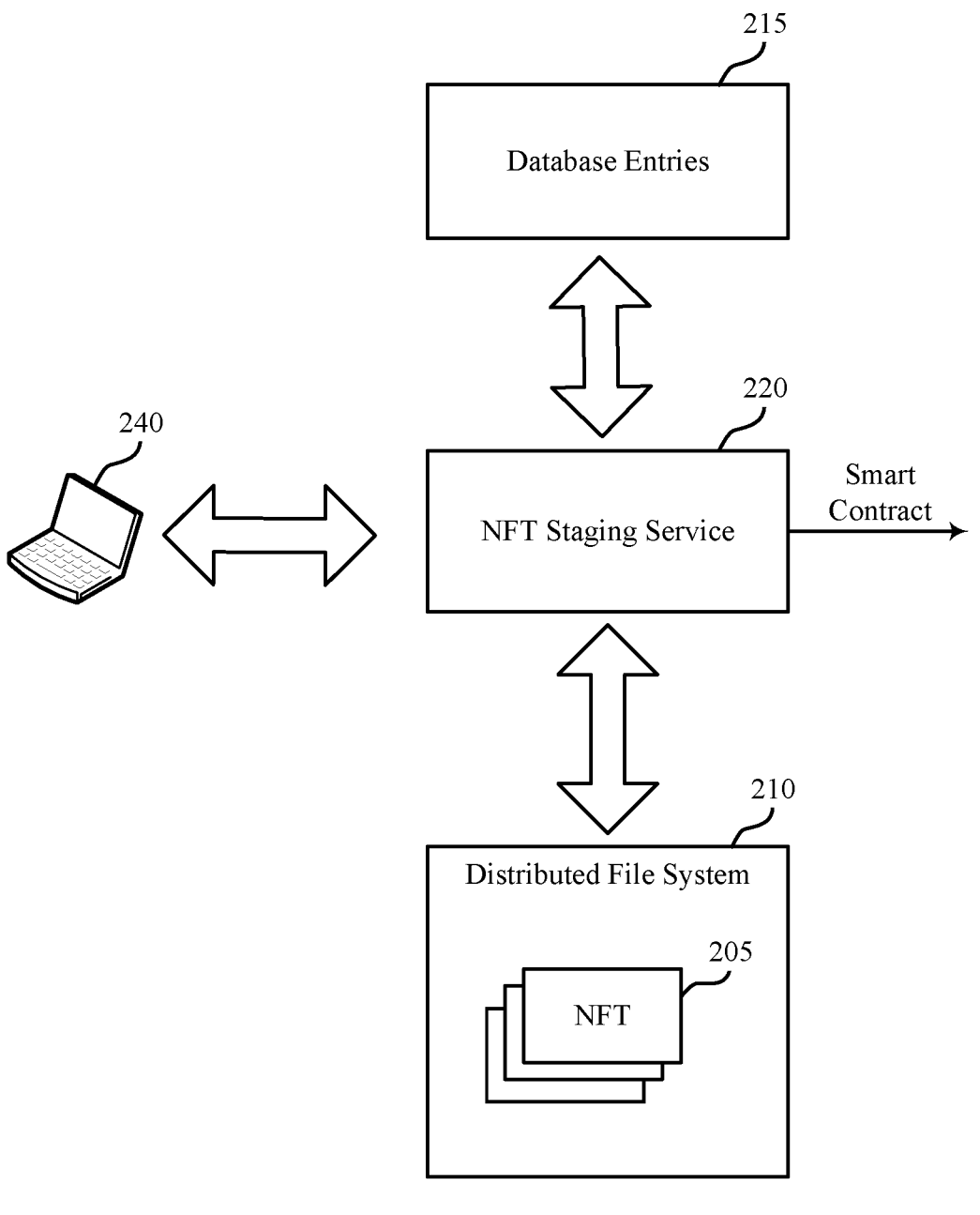
FIG. 2 shows an example of a computing environment that supports staging of non-fungible tokens (NFTs) before deployment in accordance with aspects of the present disclosure.

FIG. 2 shows an example of a computing environment 200 that supports staging of NFTs before deployment of the NFTs in accordance with aspects of the present disclosure. The computing environment 200 includes a computing device 240 that is associated with the user account of a user, a distributed filing system 210, database entries 215, and NFT staging service 220. The NFT staging service may be supported by one or more servers, which may be examples of servers supporting the custodial token platform 110 as described with respect to FIG. 1. That is, the custodial token platform 110 may support the NFT staging service 220, or the NFT staging surface may be service separate from the custodial token platform 110. The computing device 240 may be examples of the computing devices 140 as described with respect to FIG. 1. Although the discussions described herein relate to NFTs, the techniques described herein may apply to other digital assets or forms of digital media, as well as fungible tokens, such as fungible cryptocurrency (e.g., parameters or fields associated with tokens, coins, digital currency, and the like). The inputs may include inputs for creating the NFTs. For example, the user may create one or more images, and multiple images may be part of a collection of NFTs associated with the user. In some examples, the user may create the collection of NFTs using generative or automated techniques, which may result in a NFT collection with varying traits, parameters, and the like.

In the computing environment 200, a user associated the computing device 240 may create one or more NFTs to be part of a collection of NFTs. The user may provide one or more inputs (at an interface of associated with the NFT staging service 220, the custodial token platform 110 of FIG. 1, both) for a request to create the collection of NFTs and for data associated with generating the collection of NFTs (e.g., via one or more servers associated with the custodial token platform 110 of FIG. 1). For example, the user may access the user interface to start creation of a new collection, select various parameters associated with the collection (e.g., collection type), collection name, description, royalty parameters, minting procedure, etc. After receiving inputs corresponding such information, the NFT staging service 220 may generate smart contract and a transaction for deploying the smart contract via the blockchain network. The generated smart contract may be dependent on the user inputs (e.g., the collection parameters). For example, a first contract type may be deployed for ERC-721 tokens, and a second type of contract may be deployed for ERC-1155 tokens. As described herein, the user may pay a fee for deploying the contract.

Thereafter, the user interface may provide fields for inputting data or receiving data associated with the collection of NFTs (e.g., in a staging state). The NFTs of the collection of NFTs may be in the form of an image file, an audio file, a video file, and the like. In some examples, the NFTs may be associated with or represent digital or physical assets. For example, the NFTs may be associated with valuable collectible figures, a photo signed by an artist, virtual fashion items, virtual gaming items, essays or other literature, digital collectable, tickets and coupons, a generative collection of images, and the like. During the staging process, the user interface of the NFT staging service 220 may provide fields for uploading a file (e.g., comma separate value (CSV) file) containing the NFT data or inputting data for each NFT of the collection individually. After data is uploaded, the NFT staging service 220 may upload the data to the distributed file system 210 and receive links to such data (e.g., hashes of the data) as stored at the distributed file system. Additionally, the NFT staging service 220 may create database entries 215 corresponding to the data.

Additionally, during the staging process and prior to minting the collection of NFTs (e.g., deployment or publishing of the NFTs to the blockchain), the user may provide inputs to modify (e.g., edit, revise, change, add or remove data) the NFTs. The NFT-related data 205 for each NFT or collection of NFTs may be uploaded to the distributed file system 210 (based on user input at the computing device 240 for the custodial token platform). In some examples, the NFT-related data 205 may be uploaded to the distributed file system 210 as the inputted modifications to the NFTs are entered at the interface. That is, the distributed file system 210 may be updated in the background while the user modifies the NFTs during staging. In this manner, time otherwise spent for uploading data to the distributed file system 210 that indicates the modifications to the NFTs prior to minting, may be mitigated (since the final form of the NFT is updated as the modifications are entered at the interface).

As described herein, in some examples, as data is uploaded to the NFT staging service 220 and thereby to the distributed file system 210, the custodial token platform may generate database entries 215 that correspond to the NFTs. For example, a respective database entry may be generated for each NFT of the collection of NFTs. Accordingly, a first entry may correspond to a first NFT, and may include a first link to a first content (as stored in the distributed file system 210), and a second entry may correspond to a second NFT and include a second link to a second content (as stored in the distributed file system 210). Each entry of the database entries 215 may include a token identifier for a NFT, a contract identifier associated with the smart contract, and one or more links to content of the NFT stored in the distributed file system 210, where the contract identifier is a contract address. Accordingly, the custodial token platform may upload, after receiving an update, updated first content to the distributed file system 210. The custodial token platform may update the first entry to include a new first link to the updated first content, where the smart contract is updated to include information from the first entry.

Figure 3:
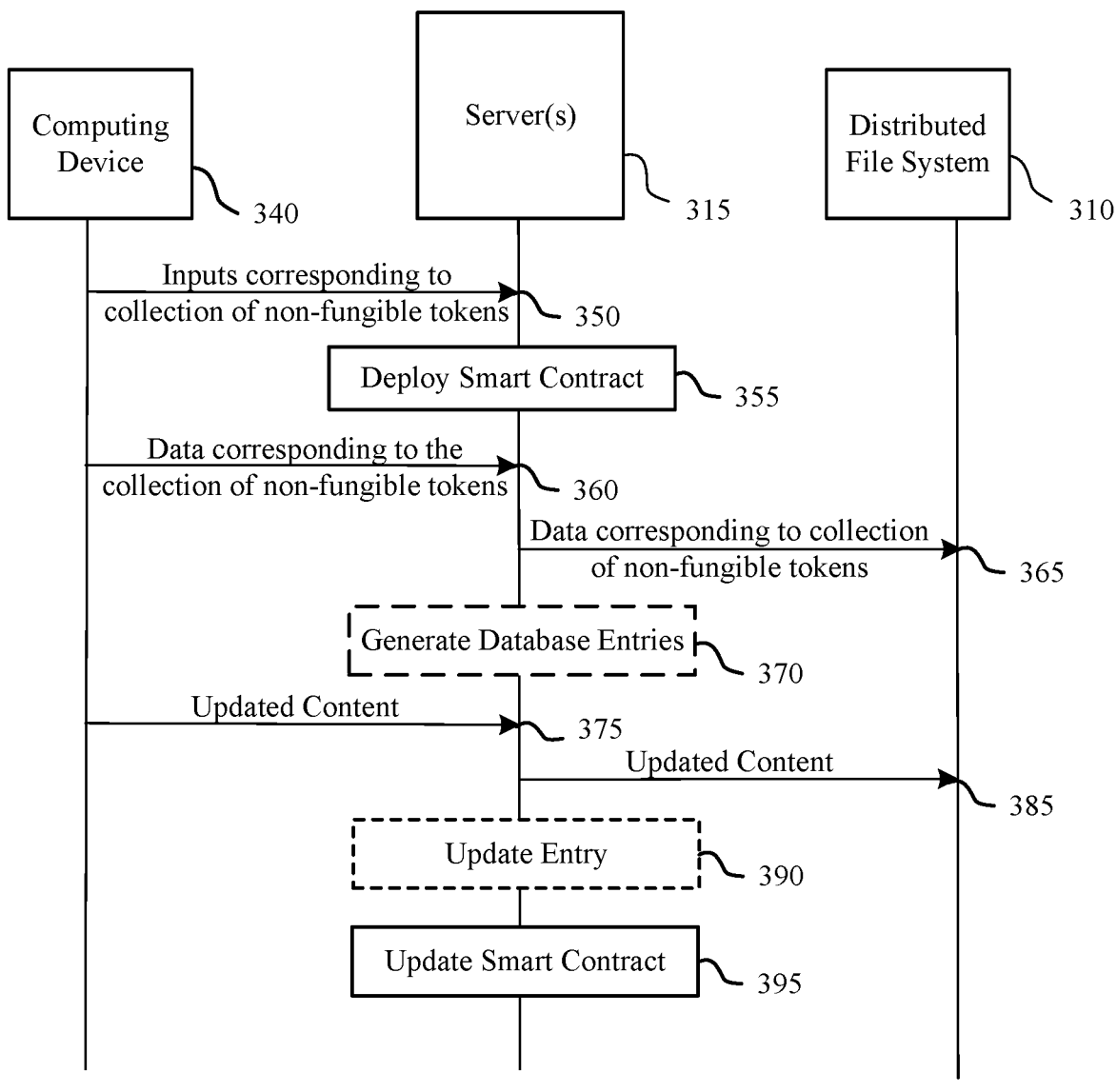
FIG. 3 shows an example of a process flow that supports staging of NFTs before deployment in accordance with aspects of the present disclosure.

FIG. 3 shows an example of a process flow 300 that supports staging of NFTs before deployment of the NFTs in accordance with aspects of the present disclosure. The process flow 300 includes a distributed file system 310, one or more servers 315, and a computing device 340, which may be examples of the corresponding devices or systems as described herein with respect to FIG. 1 and FIG. 2. For example, the server 315 may be an example of one or more servers that support a custodial token platform or NFT staging service as described with respect to FIG. 1 and FIG. 2, respectively. The computing device 240 may be an example of the computing device 140 or 240 as described with respect to FIG. 1 and FIG. 2, respectively. The distributed file system 310 may be an example of the distributed file system 210 as described with respect to FIG. 2. In the following description of the process flow 300, the operations between the distributed file system 310, the one or more servers 315, and the computing device 340, may be transmitted in a different order than the example order shown, or the operations performed may be performed in different orders or at different times. Some operations may also be omitted from the process flow 300, and other operations may be added to the process flow 300.

At 350, the one or more servers 315 (of the custodial token platform) may receive from the computing device 340, one or more user inputs corresponding to a collection of NFTs associated with a smart contract to be stored on a blockchain distributed data store (e.g., blockchain of a marketplace). The inputs may form the one or more NFTs for the collection of NFTs. In some examples, the servers 315 may receive an indication of a selection of a minting procedure, an indication of one or more contract addresses for receiving royalties or minting revenue, an indication of a collection type, a start date for minting, a mint price, and/or a maximum mint quantity per transaction.

At 355, the servers 315 may deploy the smart contract to the blockchain distributed data store based on the one or more user inputs. For example, the servers 315 may generate the smart contract based on the received input and deploy the smart contract to the blockchain distributed data store via a blockchain network. In some examples, the servers 315 may generate the transaction such that the user may sign the transaction and approve any deployment fees. At 360, the servers 315 may receive data corresponding to the collection of NFTs from the computing device 340. In some examples, receiving the data includes receiving a single file including the data corresponding to the collection of non-fungible tokens. For example, the data may be batched in a single file for a single transmission. In some examples, the servers 315 may receive multiple inputs of data corresponding to the collection of NFTs (e.g., multiple inputs or data transmissions) corresponding to respective NFTs of the collection of NFTs.

At 365, the servers 315 may upload at least a portion of the data corresponding to the collection of NFTs to the distributed file system 310. The uploading of at least the portion of the data corresponding to the collection of NFTs may include uploading first content for a first NFT of the collection of NFTs to the distributed file system 310 and uploading second content for a second NFT of the collection of NFTs to the distributed file system 310. In some examples, the first content and/or the second content may include metadata, image data, and/or audio data. In some examples, uploading at least the portion of the data includes uploading, to the distributed file system 310 and via a background process, a set of data for one or more NFTs of the collection of NFTs. In some examples, the data corresponding to the collection of NFTs may be received at a NFT marketplace, a custodial token platform, or both.

In some examples, at 370, the servers 315 may generate, after uploading at least the portion of the data corresponding to the collection of NFTs to the distributed file system 310, database entries that correspond to the collection of NFTs. The database entries may include a first entry corresponding to the first NFT and including at least a first link to the first content, and a second entry corresponding to a second NFT token and including at least a second link to the second content. In some examples, each entry of the database entries includes a token identifier for a NFT, a contract identifier associated with the smart contract, and one or more links to content of the NFT stored in the distributed file system 310, where the contract identifier is a contract address.

At 375, the servers 315 may receive from the computing device 340, an indication of an update to one or more of the NFTs. For example, the user may enter the NFT staging process so that the user may revise or edit the draft NFTs in the staging process. In some examples, receiving the update to the first content includes receiving a modification of the first content of at least one NFT of the collection of NFTs. For example, the user may change the image corresponding to an NFT via a user interface of the NFT staging service. Additionally, or alternatively, the user may change descriptions, traits, or other metadata for the NFT. At 385, the servers 315 may upload the update for the collection of NFTs to the distributed file system 310. In some examples, the updates may include changes, where the changes may be uploaded as the update as soon as the modification is made. For example, the servers 315 may upload, after receiving the update, updated first content to the distributed file system 310. In some examples, at 390, the servers 315 may update the first entry to include a new first link to the updated first content. That is, after the updated content is uploaded to the distributed file system 310, the servers 315 may update the database entry corresponding to the updated NFT to include a new link to the updated content at the distributed file system 310. At 395, the servers 315 may update the smart contract stored on the blockchain distributed data store to include one or more indications of at least the portion of the data corresponding to the collection of NFTs and one or more indications of the updated first content. Updating the smart contract may include generating and broadcasting one or more messages (e.g., transactions) via the blockchain network such as to update the smart contract with the NFT data corresponding to the collection of NFTs. In some examples (e.g., according to a lazy minting procedure), the servers 315 may receive from the client associated with a wallet address, a request to mint a non-fungible token of the collection of NFTs. The servers 315 may transmit, to the client, a transaction that is configured to mint the non-fungible token, and the servers 315 may detect, via the blockchain distributed data store, a message that includes the payload, the message is signed by a private key associated with the wallet address and results in the non-fungible token being transferred to the wallet address.

Figure 4:
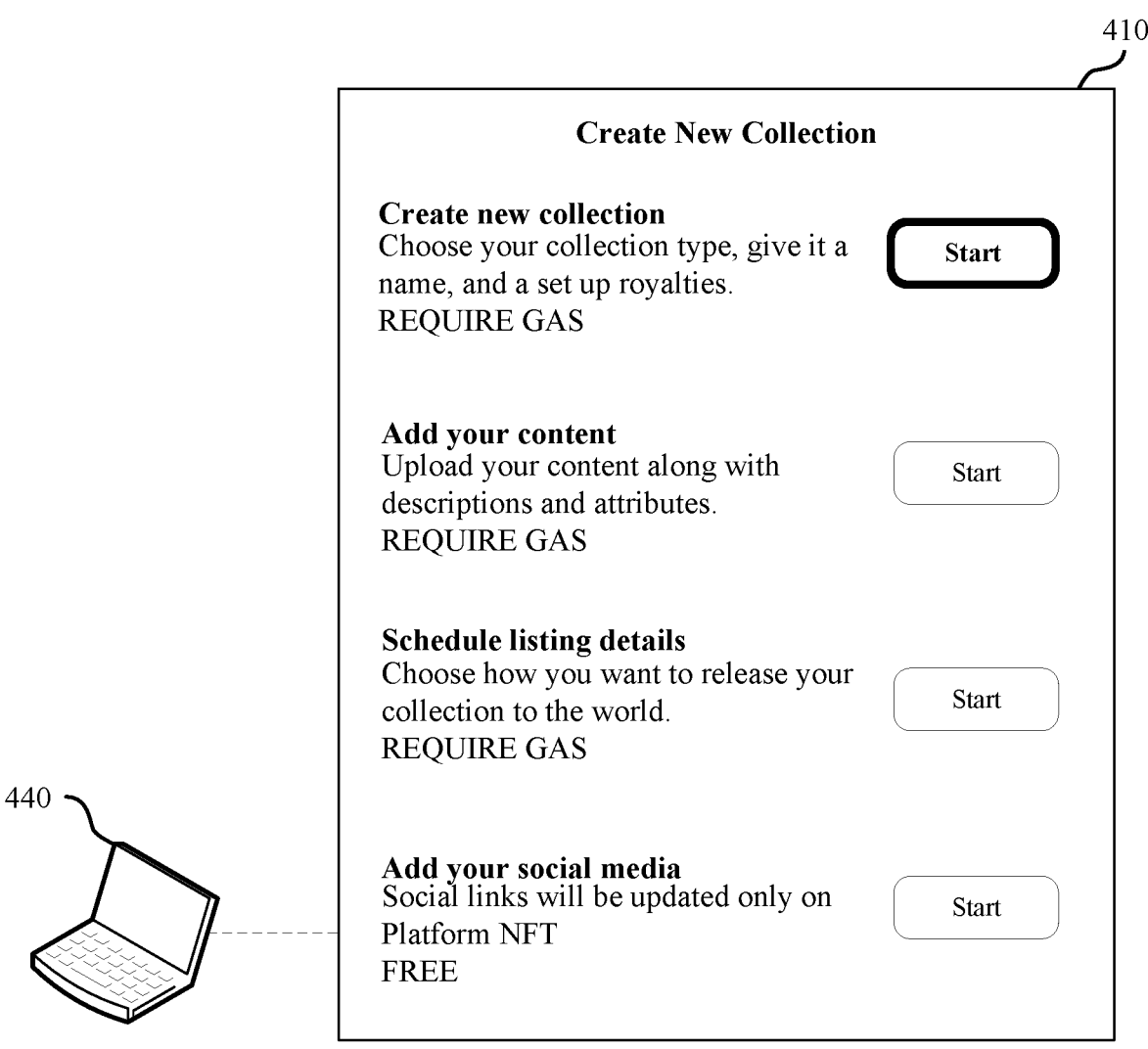
FIG. 4 shows an example of creating a collection of NFTs that supports staging of NFTs before deployment in accordance with aspects of the present disclosure.

FIG. 4 shows an example of creating a collection of NFTs 400 that supports staging of NFTs before deployment in accordance with aspects of the present disclosure. A computing device 440 may be an example of the computing device 140, 240, or 340 as described with respect to FIGS. 1, 2, and 3, respectively. To create the collection of NFTs that include one or more NFTs, the computing device 440 may receive input at an interface 410 of an application associated with the custodial token platform (e.g., the interface 410 of the NFT staging service).

The inputs may indicate a request to create the one or more NFTs or to create a collection of the NFTs. The user may select "start" to enter a portion of "creating new collection" of NFTs. For example, creating the new collection may involve receiving inputs indicating a collection type, a name of the collection, as well as royalties to set up with the collection, at the interface 410 of the computing device 440. Creating the collection of NFTs may be associated with a gas fee.

In some examples, the user may select a "start" button to "adding your content" at the server (e.g., via the interface 410 of the computing device 440). For example, the user may upload content (e.g., image file or audio file) along with descriptions and attributes (e.g., name of collection of audio files). Adding content for the collection of NFTs may be associated with a gas fee.

In some examples, the user may select "start" for "scheduling listing details" at the server (e.g., via the interface 410 of the computing device 440). Scheduling may involve listing how the collection of NFTs is to be released to the world (e.g., the blockchain network). Scheduling listing details of the collection of NFTs may be associated with a gas fee.

In some examples, the user of the computing device 440 may select a "start" button to "add your social media" at the server (e.g., via the interface 410 of the computing device 440). In this manner, social links associated with uploading or modifying content may be updated on the custodial platform for the NFTs.

FIG. 5 shows an example of an input of descriptions for a collection of NFTs 500 that supports staging of NFTs before deployment in accordance with aspects of the present disclosure. A computing device 540 may be an example of the computing device 140, 240, 340, 440 as described with respect to FIGS. 1, 2, 3, and 4 respectively.

To describe the collection of NFTs that include one or more NFTs, the computing device 540 may receive (from a user) input at an interface 510 of an application associated with the custodial token platform or an application that is used to access the NFT service. The inputs may be entered via one or more buttons or fields for one or more parameters. For example, the parameters may include "what is your collection type?" and "who will mint your NFTs?" with associated fields for the user to input the requested information (e.g., collection type and minting the NFTs). In some examples, the fields may be editable so that that the user enters the information. In some examples, the interface 510 may provide options, for example, as selectable buttons to indicate selection. For example, for the collection type, the interface 510 may include multiple selectable buttons. In this example, the selectable buttons may be an "ERC-721" collection where "every NFT in your collection is one-of-a kind, such as 100 unique images" or an "ERC-1155" where "some NFTs are the same. For example, 5 image with 20 copies each." Moreover, in some examples, some options may be unavailable based on other NFT-related data or based on the custodial token platform. In such examples, the unavailable option may be indicated to the user, such as by a grayed selectable button (indicating that the button is not selectable) or another method of indication. In some examples, after the user selects one of the selectable buttons, the selection is indicated, such as by a bolding the selectable button, changing the font in the selectable button, highlighting the selectable button, and so forth.

In some examples, such as for the minting selection, the interface 510 may include multiple selectable buttons. In this example, the selectable buttons may be an "I'll mint myself" minting where "you'll pay the network fee for each NFT" or a "my community will mint" where "your buyers will pay the network fees." If the user chooses to mint the NFTs, then the user will pay the network gas fees to mint the NFTs on-chain (e.g., NFT collection indicated in smart contract deployed to the blockchain). Users may select this option when a user plans to create NFTs for the user's own use and/or to offer unique pieces for primary sale from the user's profile where purchasing users may select the specific NFT to purchase. If the user selects to have the community mint the NFTs, the community will pay the network gas fees to mint the NFTs directly. The community mint option may be an example of a lazy minting procedure, as described herein.

Figure 6:
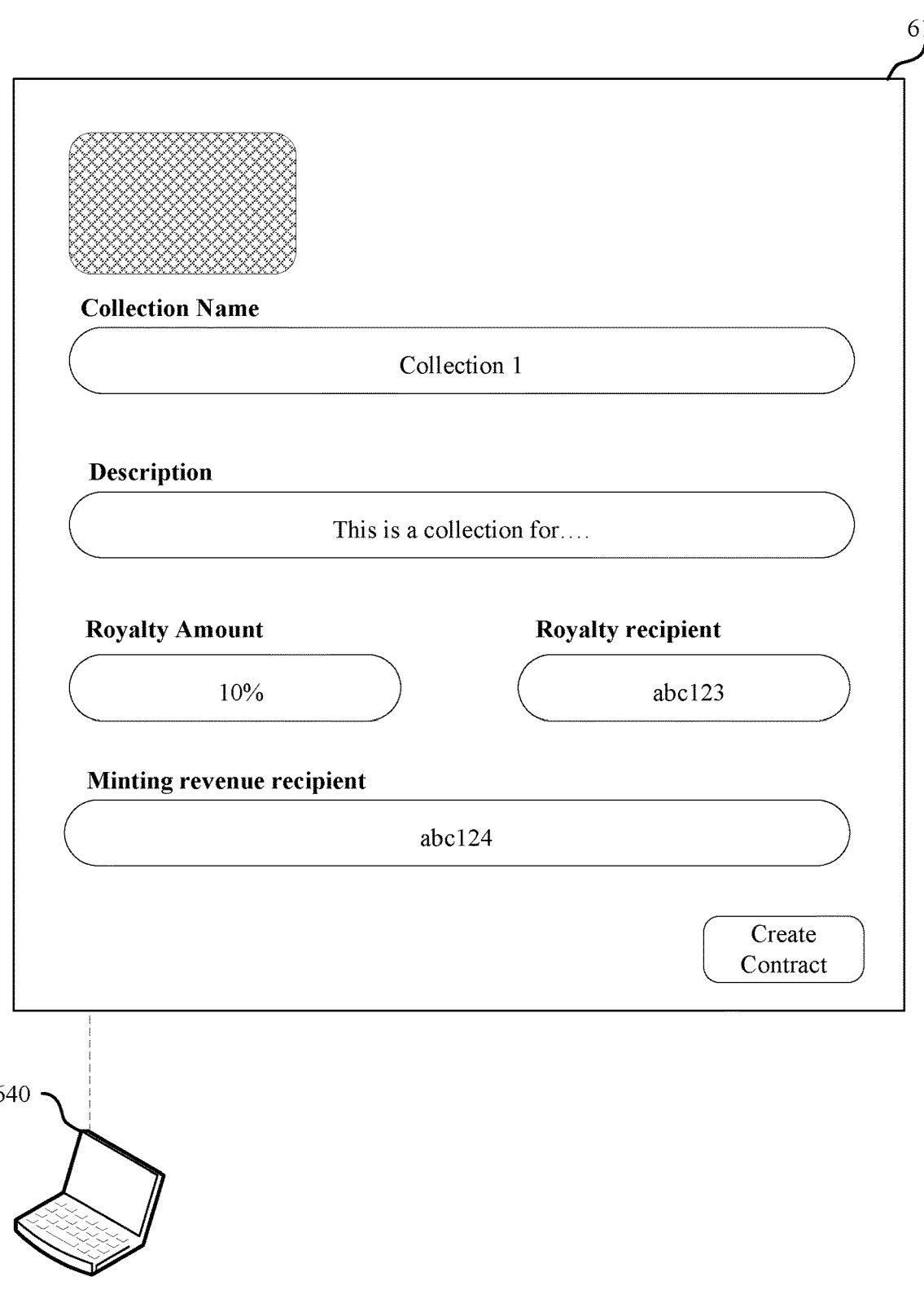
FIG. 6 shows an example of an input of descriptions for a collection of NFTs that supports staging of NFTs before deployment in accordance with aspects of the present disclosure.

FIG. 6 shows an example of an input of descriptions for a collection of NFTs 600 that supports staging of NFTs before deployment in accordance with aspects of the present disclosure. A computing device 640 may be an example of the computing device 140, 240, 340, 440, 540 as described with respect to FIGS. 1, 2, 3, 4, and 5 respectively.

To describe the collection of NFTs that include one or more NFTs, the computing device 640 may receive input at an interface 610 of an application associated with the custodial token platform. The inputs may be entered in one or more fields for one or more parameters. For example, the parameters may include the NFT, the collection of NFTs (e.g., image), a representation of the NFTs, and parameters requesting information including "collection name," "description," royalty amount," royalty recipient," and "minting revenue receipt" with associated fields for the user to input the requested information. In some examples, the fields may be editable so that that the user may enter the information. Using the parameters and fields, the user may input information about the collection, the address that will receive funds from the mint, and cost what address will receive future royalties each time the NFT or NFT collection is sold. Accordingly, the user may upload an image or audio file for the NFT, as well as input letter and numbers in the description fields. For example, the user may input "Collection 1" for the collection name, "this is a collection for . . . " for the description, "10%" for the royalty amount, "abc123" as the address for the royalty recipient, and "abc124" as the address for the minting revenue recipient. After inputting the information, the user may select a "create contract" button to generate an associated smart contract to be deployed to the blockchain. After adding these details and selecting "create contract," the user may select an "open wallet to confirm" button to confirm the contract. The user may pay the gas fee to complete the process of creating the smart contract for the NFTs (e.g., token contract), which may deploy the smart contract on the blockchain. After the contract is deployed, the user may access the service or user interface for the staging procedure, as described herein.

Figure 7:
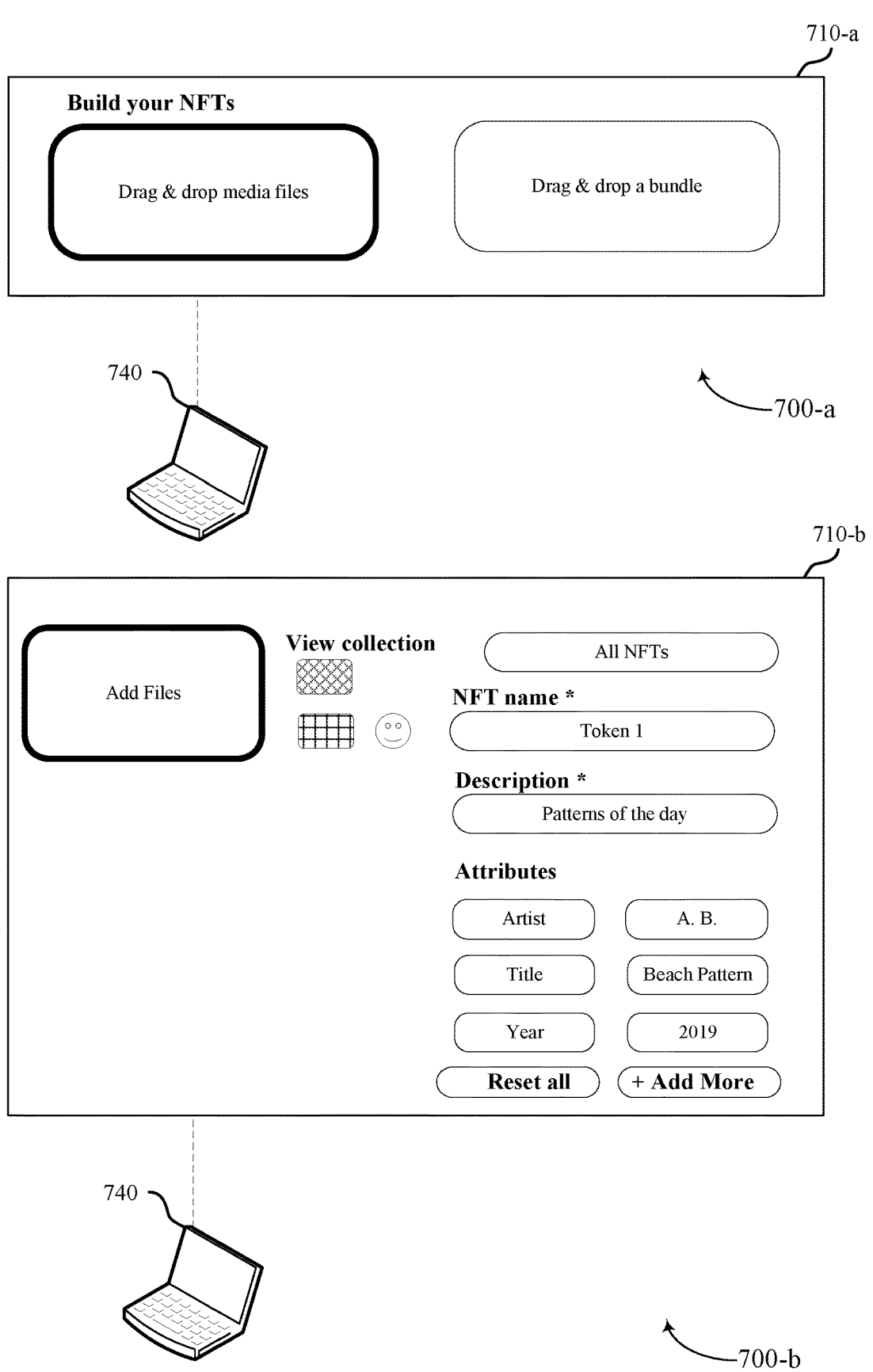
FIG. 7 shows an example of an uploading of content of the collection of NFTs that supports staging of NFTs before deployment in accordance with aspects of the present disclosure.

FIG. 7 shows an example of an uploading of content 700 (e.g., 700-*a* and 700-*b*) that supports staging of NFTs before deployment in accordance with aspects of the present disclosure. A computing device 740 may be an example of the computing device 140, 240, 340, 440, 540, 640 as described with respect to FIGS. 1, 2, 3, 4, 5, and 6 respectively.

To upload the collection of NFTs that include one or more NFTs, the computing device 740 may receive input at an interface 710 (e.g., 710-*a* and 710-*b*) of an application (e.g., an application of a NFT staging service). The inputs may be entered in one or more fields for one or more parameters. For example, the parameters may include the method for building the NFT, and parameters requesting information including "NFT name," "description," "attributes" with associated fields for the user to input the requested information, as well as selectable buttons to add or remove parameters. In some examples, the fields may be editable so that that the user may enter the information. Using the parameters and fields, the user may input information for building the NFT collection.

Accordingly, at a first interface 710-*a*, the user may select a button on how to build the NFTs, including "drag and drop media files" to upload individual files and to edit the metadata later, or "drag and drop a bundle" to upload multiple files in a single instance. The user may select the "drag and drop a bundle" for multiple media files and associated.csv or json files containing metadata. In this manner, the NFT or NFTs may be individually uploaded and built or may be uploaded in a single batch. Uploading in a single batch may be beneficial when the descriptions, such as NFT name, attributes, etc. are the same for the NFTs in the bundle. The custodial token platform may support many different media files as well as .json or .csv files to update media files and metadata simultaneously. The file may contain one.csv or .json file with metadata, and the file may have a name column, which defines the name of the NFT. Asset names may be sequential (e.g., 0), 1, 2, 3, etc.) in the file. In some examples, images and other file types may be used in combination for the upload. Both may follow the asset naming convention (e.g., 0.png and 0.mp4, 1.png and 1.glb, etc.). When the user selects files, the custodial token platform may upload them to the distributed file system (e.g., distributed file system 310 of FIG. 3). If the user chooses to map media files to the NFTs, the user may add the name of the files to the image and to an animation_url column. If files have already been uploaded to distributed file system, distributed file system hashes may be added to the image and animation_url column.

At a second interface 710-*b*, the user may view, at the "view collection," the uploaded NFTs that were uploaded at the first interface 710-*a*. The user may input letters and numbers in the fields of the various parameters. At a second interface 710-*b*, the user may input "Token 1" for the NFT name, "pattern of the day" for the description, "10%" for the royalty amount, "abc123" as the address for the royalty recipient, "A.B." for the artist attribute, "beach pattern" for the title attribute, and "2019" for the year attribute. Based on the NFT, the user may add as reset the fields (e.g., back to blank) using the "reset all." The user may use an "+ add more" button to add additional NFTs to the collection. After inputting the information, the user may select a "create contract" button to generate an associated smart contract to be deployed to the blockchain or update the previously deployed contract. After adding these details and selecting "create contract," the user may select an "open wallet to confirm" button. In some examples, the user may add files, for example, to add NFTs to the collection of NFTs or for the one or more fields associated with the one or more parameters. In some examples, if the user chooses to upload all of the content as a batch, the attributes may already be coded into the files.

As described herein, the second interface 710-*b* may be displayed after the user selects one of the options at the first interfaced 710-*a*. For example, the user may drop a bundle or a set of media files, and the second interface 710-*b* may be used to navigate between the individual NFTs and to confirm, verify, or update the details (e.g., parameters) associated with the individual NFTs. Thus, as described herein, after the NFTs are uploaded to the server (e.g., the NFT staging service), the server may upload aspects of the individual NFTs to the distributed file system. If a user subsequently changes aspects for the NFT, the server automatically uploads the updated content, and the link to the updated data is added to the NFT collection as stored at the server. After the user verifies and updates the individual NFTs, the user may selectively upload the NFTs to the smart contract, as described herein.

FIG. 8 shows an example of a setting minting details for the collection of NFTs 800 that supports staging of NFTs before deployment in accordance with aspects of the present disclosure. A computing device 840 may be an example of the computing device 140, 240, 340, 440, 540, 640, and 740 as described with respect to FIGS. 1, 2, 3, 4, 5, 6, and 7 respectively.

To set the minting details, the user may input information at an interface 810 of the computing device 840. For example, the user may set the schedule for releasing the collection of NFTs. The inputs may be entered in one or more fields for one or more parameters. For example, the parameters may include a "start date for minting," a "time," a "set mint price for each NFT," "how many NFTs can be minted in one transaction," and "who can mint," with associated fields for the user to input the requested information, as well as selectable buttons. For example, the selectable button may include "add release" once the scheduling information has been inputted.

In some examples, the user may input "Oct. 7, 2022" for the start date for minting, "12:51 PM" for the time, "0 ETH" for the mint price, "1 NFT" for the quantity of NFTs that are minted in one transaction, and "anyone" for who can mint. In some examples, the parameters may include a wait time between NFT mints to prevent collectors from minting most of the NFTs as soon as they become available. In some examples, more than one release may be scheduled for the NFTs. Each release may have a different date and price. Additionally, the user may set which wallets are allowed to mint. A user may limit which wallets may mint during a specific release by adding a .csv file of the wallet addresses that are permitted to mint during the release. Once the details for the schedule have been inputted, the user may select "update" to update the minting contract, and subsequently pay a network gas fee. As described herein, updating the minting contract may include broadcasting one or more messages or transactions that include the data that is used to update the contract.

Figure 9:
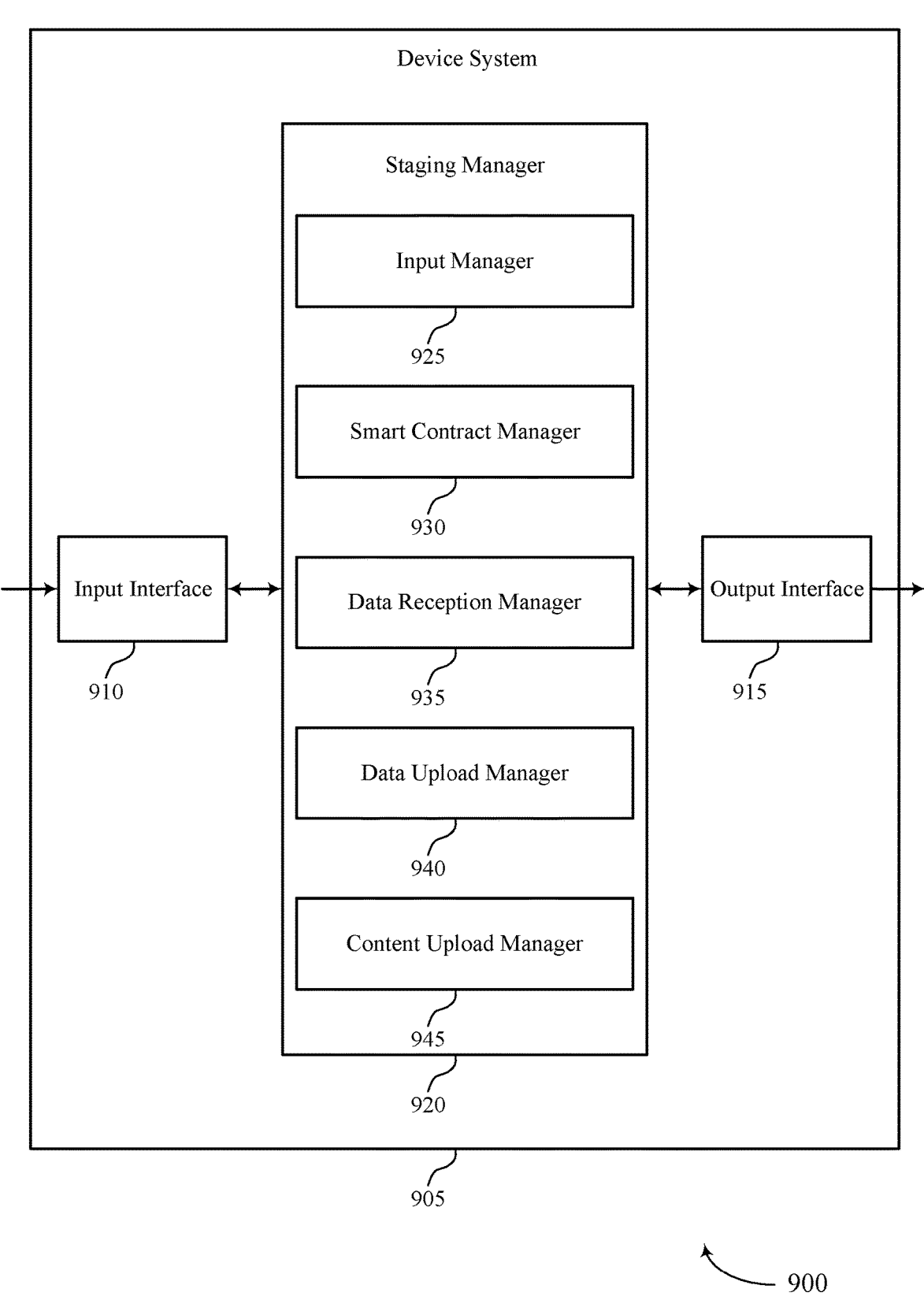
FIG. 9 shows a block diagram of an apparatus that supports staging of NFTs before deployment in accordance with aspects of the present disclosure.

FIG. 9 shows a block diagram 900 of a system 905 that supports staging of NFTs before deployment in accordance with aspects of the present disclosure. The system 905 may include an input interface 910, an output interface 915, and a staging manager 920. The system 905 may also include a processor. Each of these components may communicate, directly or indirectly, with one another (e.g., via one or more buses, communications links, communications interfaces, or any combination thereof).

The input interface 910 may manage input signaling for the system 905. For example, the input interface 910 may receive input signaling (e.g., messages, packets, data, instructions, commands, transactions, or any other form of encoded information) from other systems or devices. The input interface 910 may send signaling corresponding to (e.g., representative of or otherwise based on) such input signaling to other components of the system 905 for processing. For example, the input interface 910 may transmit such corresponding signaling to the staging manager 920 to support staging of NFTs before deployment. In some cases, the input interface 910 may be a component of a network interface 1125 as described with reference to FIG. 11.

The output interface 915 may manage output signaling for the system 905. For example, the output interface 915 may receive signaling from other components of the system 905, such as the staging manager 920, and may transmit such output signaling corresponding to (e.g., representative of or otherwise based on) such signaling to other systems or devices. In some cases, the output interface 915 may be a component of a network interface 1125 as described with reference to FIG. 11.

For example, the staging manager 920 may include an input manager 925, a smart contract manager 930, a data reception manager 935, a data upload manager 940, a content upload manager 945, or any combination thereof. In some examples, the staging manager 920, or various components thereof, may be configured to perform various operations (e.g., receiving, monitoring, transmitting) using or otherwise in cooperation with the input interface 910, the output interface 915, or both. For example, the staging manager 920 may receive information from the input interface 910, send information to the output interface 915, or be integrated in combination with the input interface 910, the output interface 915, or both to receive information, transmit information, or perform various other operations as described herein.

The staging manager 920 may support modifying NFTs in accordance with examples as disclosed herein. The input manager 925 may be configured as or otherwise support a means for receiving one or more user inputs corresponding to a collection of NFTs associated with a smart contract to be stored on a blockchain distributed data store. The smart contract manager 930 may be configured as or otherwise support a means for deploying the smart contract to the blockchain distributed data store based on the one or more user inputs. The data reception manager 935 may be configured as or otherwise support a means for receiving data corresponding to the collection of NFTs. The data upload manager 940 may be configured as or otherwise support a means for uploading at least a portion of the data corresponding to the collection of NFTs to a distributed file system, wherein uploading at least the portion of the data corresponding to the collection of NFTs comprises. The content upload manager 945 may be configured as or otherwise support a means for uploading first content for a first non-fungible token to the distributed file system. The content upload manager 945 may be configured as or otherwise support a means for uploading second content for a second non-fungible token to the distributed file system. The content upload manager 945 may be configured as or otherwise support a means for receiving an update to the first content for the first non-fungible token of the collection of NFTs. The content upload manager 945 may be configured as or otherwise support a means for uploading, after receiving the update, updated first content to the distributed file system. The smart contract manager 930 may be configured as or otherwise support a means for updating the smart contract stored on the blockchain distributed data store to include one or more indications of at least the portion of the data corresponding to the collection of NFTs and one or more indications of the updated first content.

Figure 10:
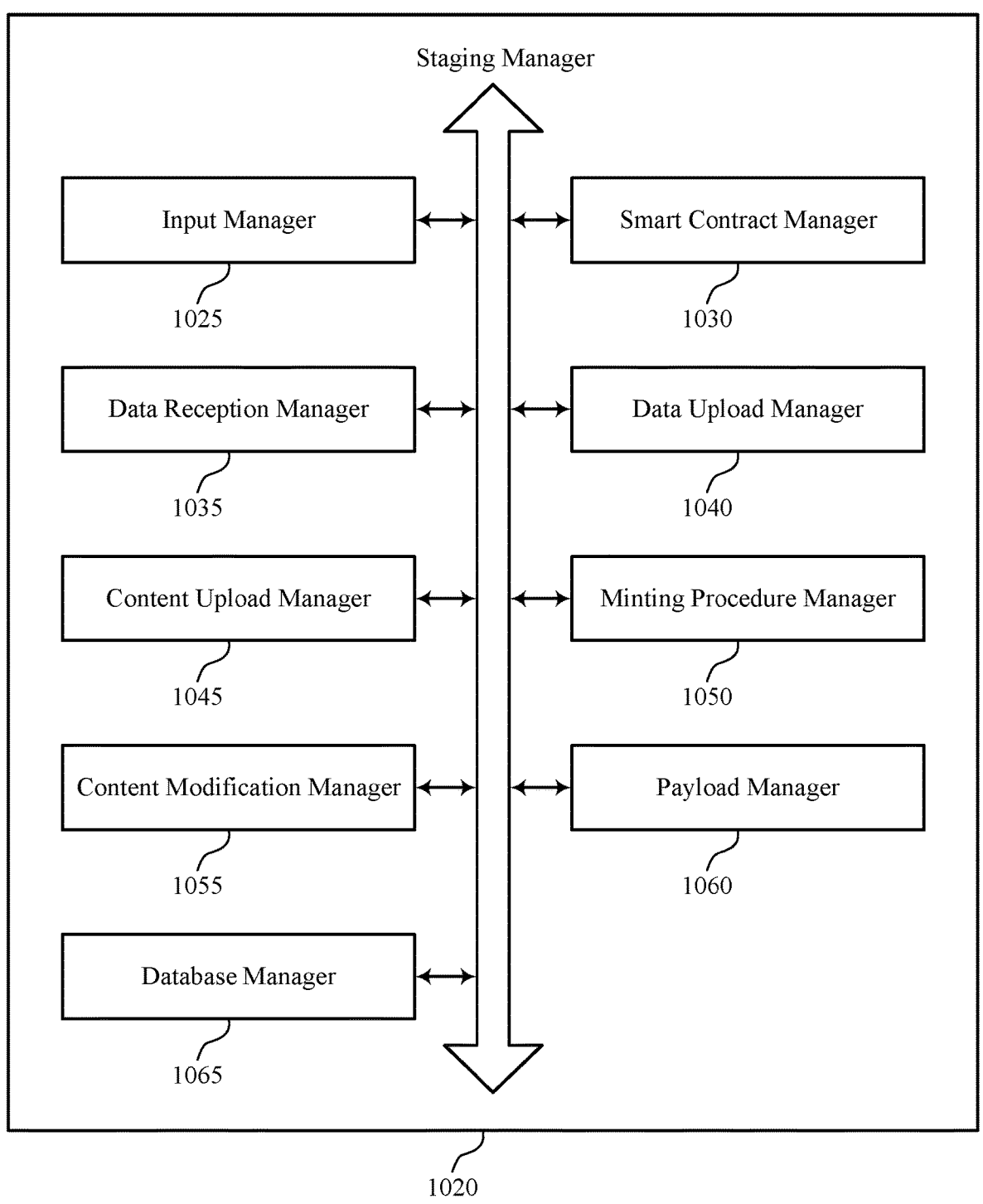
FIG. 10 shows a block diagram of a staging manager that supports staging of NFTs before deployment in accordance with aspects of the present disclosure.

FIG. 10 shows a block diagram 1000 of a staging manager 1020 that supports staging of NFTs before deployment in accordance with aspects of the present disclosure. The staging manager 1020 may be an example of aspects of a staging manager or a staging manager 920, or both, as described herein. The staging manager 1020, or various components thereof, may be an example of means for performing various aspects of staging of NFTs before deployment as described herein. For example, the staging manager 1020 may include an input manager 1025, a smart contract manager 1030, a data reception manager 1035, a data upload manager 1040, a content upload manager 1045, a minting procedure manager 1050, a content modification manager 1055, a payload manager 1060, a database manager 1065, or any combination thereof. Each of these components may communicate, directly or indirectly, with one another (e.g., via one or more buses, communications links, communications interfaces, or any combination thereof).

The staging manager 1020 may support modifying NFTs in accordance with examples as disclosed herein. The input manager 1025 may be configured as or otherwise support a means for receiving one or more user inputs corresponding to a collection of NFTs associated with a smart contract to be stored on a blockchain distributed data store. The smart contract manager 1030 may be configured as or otherwise support a means for deploying the smart contract to the blockchain distributed data store based on the one or more user inputs. The data reception manager 1035 may be configured as or otherwise support a means for receiving data corresponding to the collection of NFTs. The data upload manager 1040 may be configured as or otherwise support a means for uploading at least a portion of the data corresponding to the collection of NFTs to a distributed file system, wherein uploading at least the portion of the data corresponding to the collection of NFTs comprises. The content upload manager 1045 may be configured as or otherwise support a means for uploading first content for a first non-fungible token to the distributed file system. In some examples, the content upload manager 1045 may be configured as or otherwise support a means for uploading second content for a second non-fungible token to the distributed file system. In some examples, the content upload manager 1045 may be configured as or otherwise support a means for receiving an update to the first content for the first non-fungible token of the collection of NFTs. In some examples, the content upload manager 1045 may be configured as or otherwise support a means for uploading, after receiving the update, updated first content to the distributed file system. In some examples, the smart contract manager 1030 may be configured as or otherwise support a means for updating the smart contract stored on the blockchain distributed data store to include one or more indications of at least the portion of the data corresponding to the collection of NFTs and one or more indications of the updated first content.

In some examples, to support receiving the one or more user inputs, the minting procedure manager 1050 may be configured as or otherwise support a means for receiving an indication of a selection of a minting procedure, an indication of one or more contract addresses for receiving royalties or minting revenue, an indication of a collection type, a start date for minting, a mint price, a maximum mint quantity per transaction, or a combination thereof.

In some examples, to support receiving the data, the data reception manager 1035 may be configured as or otherwise support a means for receiving a single file comprising the data corresponding to the collection of NFTs.

In some examples, the input manager 1025 may be configured as or otherwise support a means for receiving a plurality of individual inputs of data corresponding to the collection of NFTs.

In some examples, to support receiving the update to the first content, the content modification manager 1055 may be configured as or otherwise support a means for receiving a modification of the first content of at least one non-fungible token of the collection of NFTs.

In some examples, to support uploading at least the portion of the data, the data upload manager 1040 may be configured as or otherwise support a means for uploading, to the distributed file system and via a background process, a set of data for one or more NFTs of the collection of NFTs.

In some examples, the data corresponding to the collection of NFTs is received at a non-fungible token marketplace, a custodial token platform, or both.

In some examples, the minting procedure manager 1050 may be configured as or otherwise support a means for receiving from a client associated with a wallet address, a request to mint a non-fungible token of the collection of NFTs. In some examples, the payload manager 1060 may be configured as or otherwise support a means for transmitting, to the client, a transaction that is configured to mint the non-fungible token. In some examples, the payload manager 1060 may be configured as or otherwise support a means for detecting, via the blockchain distributed data store, a message that includes the payload, the message is signed by a private key associated with the wallet address and results in the non-fungible token being transferred to the wallet address.

In some examples, the first content, the second content, or both comprises metadata, image data, audio data, or a combination thereof.

In some examples, the database manager 1065 may be configured as or otherwise support a means for generating, after uploading at least the portion of the data corresponding to the collection of NFTs to the distributed file system, database entries that correspond to the collection of NFTs, the database entries including: a first entry corresponding to the first non-fungible token and including at least a first link to the first content, and a second entry corresponding to the second non-fungible token and including at least a second link to the second content.

In some examples, each entry of the database entries comprises a token identifier for a non-fungible token, a contract identifier associated with the smart contract, and one or more links to content of the non-fungible token stored in the distributed file system. In some examples, the contract identifier is a contract address.

In some examples, the content upload manager 1045 may be configured as or otherwise support a means for uploading, after receiving the update, updated first content to the distributed file system. In some examples, the database manager 1065 may be configured as or otherwise support a means for updating the first entry to include a new first link to the updated first content, wherein the smart contract is updated to include information from the first entry.

Figure 11:
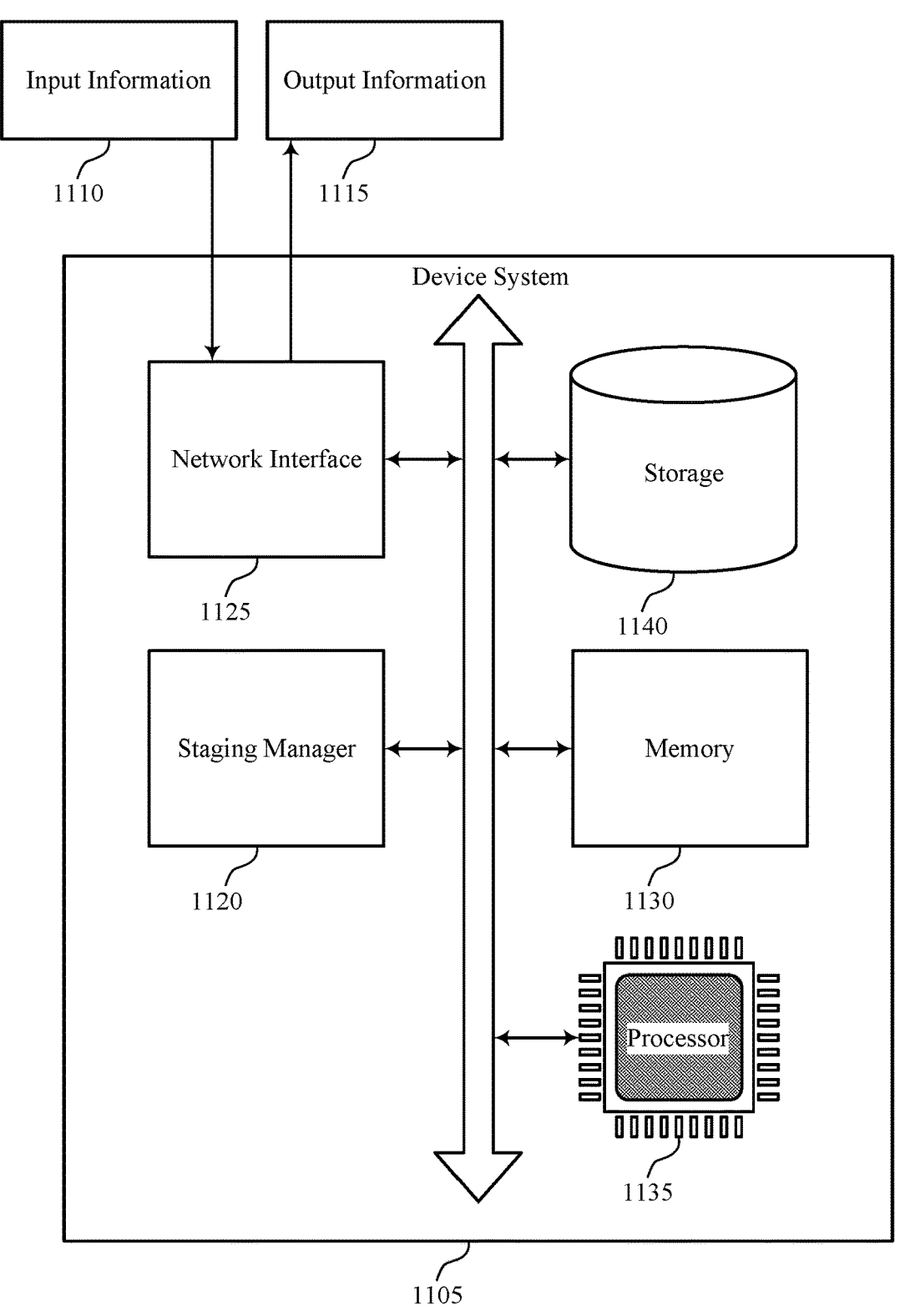
FIG. 11 shows a diagram of a system including a device that supports staging of NFTs before deployment in accordance with aspects of the present disclosure.

FIG. 11 shows a diagram 1100 of a system 1105 that supports staging of NFTs before deployment in accordance with aspects of the present disclosure. The system 1105 may be an example of or include the components of a system 905 as described herein. The system 1105 may include components for bi-directional voice and data communications including components for transmitting and receiving communications, such as a staging manager 1120, an input information 1110, an output information 1115, a network interface 1125, a memory 1130, a processor 1135, and a storage 1140. Each of these components may communicate, directly or indirectly, with one another (e.g., via one or more buses, communications links, communications interfaces, or any combination thereof).

The network interface 1125 may enable the system 1105 to exchange information (e.g., input information 1110, output information 1115, or both) with other systems or devices (not shown). For example, the network interface 1125 may enable the system 1105 to connect to a network (e.g., a network 135 as described herein). The network interface 1125 may include one or more wireless network interfaces, one or more wired network interfaces, or any combination thereof.

Memory 1130 may include RAM, ROM, or both. The memory 1130 may store computer-readable, computer-executable software including instructions that, when executed, cause the processor 1135 to perform various functions described herein, such as functions supporting staging of NFTs before deployment. In some cases, the memory 1130 may contain, among other things, a basic input/output system (BIOS), which may control basic hardware or software operation such as the interaction with peripheral components or devices. In some cases, the memory 1130 may be an example of aspects of one or more components of a custodial token platform 110 as described with reference to FIG. 1.

The processor 1135 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 1135 may be configured to execute computer-readable instructions stored in a memory 1130 to perform various functions (e.g., functions or tasks supporting staging of NFTs before deployment). Though a single processor 1135 is depicted in the example of FIG. 11, it is to be understood that the system 1105 may include any quantity of one or more of processors 1135 and that a group of processors 1135 may collectively perform one or more functions ascribed herein to a processor, such as the processor 1135.

Storage 1140 may be configured to store data that is generated, processed, stored, or otherwise used by the system 1105. In some cases, the storage 1140 may include one or more HDDs, one or more SDDs, or both. In some examples, the storage 1140 may be an example of a single database, a distributed database, multiple distributed databases, a data store, a data lake, or an emergency backup database. In some examples, the storage 1140 may be an example of one or more components described with reference to FIG. 1, such as one or more network disks.

The staging manager 1120 may support modifying NFTs in accordance with examples as disclosed herein. For example, the staging manager 1120 may be configured as or otherwise support a means for receiving one or more user inputs corresponding to a collection of NFTs associated with a smart contract to be stored on a blockchain distributed data store. The staging manager 1120 may be configured as or otherwise support a means for deploying the smart contract to the blockchain distributed data store based on the one or more user inputs. The staging manager 1120 may be configured as or otherwise support a means for receiving data corresponding to the collection of NFTs. The staging manager 1120 may be configured as or otherwise support a means for uploading at least a portion of the data corresponding to the collection of NFTs to a distributed file system, wherein uploading at least the portion of the data corresponding to the collection of NFTs comprises. The staging manager 1120 may be configured as or otherwise support a means for uploading first content for a first non-fungible token to the distributed file system. The staging manager 1120 may be configured as or otherwise support a means for uploading second content for a second non-fungible token to the distributed file system. The staging manager 1120 may be configured as or otherwise support a means for receiving an update to the first content for the first non-fungible token of the collection of NFTs. The staging manager 1120 may be configured as or otherwise support a means for uploading, after receiving the update, updated first content to the distributed file system. The staging manager 1120 may be configured as or otherwise support a means for updating the smart contract stored on the blockchain distributed data store to include one or more indications of at least the portion of the data corresponding to the collection of NFTs and one or more indications of the updated first content.

By including or configuring the staging manager 1120 in accordance with examples as described herein, the system 1105 may support techniques for increasing flexibility in modifying NFTs after deploying the smart contract to the blockchain, as well reducing costs otherwise associated with having to deploy new smart contracts and minting the new NFTs if a user wants to modify existing NFTs.

FIG. 12 shows a flowchart illustrating a method 1200 that supports staging of non-fungible tokens before deployment in accordance with aspects of the present disclosure. The operations of the method 1200 may be implemented by a custodial token platform or its components as described herein. For example, the operations of the method 1200 may be performed by a custodial token platform as described with reference to FIGS. 1 through 11. In some examples, a custodial token platform may execute a set of instructions to control the functional elements of the custodial token platform to perform the described functions. Additionally, or alternatively, the custodial token platform may perform aspects of the described functions using special-purpose hardware.

At 1205, the method may include receiving one or more user inputs corresponding to a collection of non-fungible tokens associated with a smart contract to be stored on a blockchain distributed data store. The operations of block 1205 may be performed in accordance with examples as disclosed herein. In some examples, aspects of the operations of 1205 may be performed by an input manager 1025 as described with reference to FIG. 10.

At 1210, the method may include deploying the smart contract to the blockchain distributed data store based on the one or more user inputs. The operations of block 1210 may be performed in accordance with examples as disclosed herein. In some examples, aspects of the operations of 1210 may be performed by a smart contract manager 1030 as described with reference to FIG. 10.

At 1215, the method may include receiving data corresponding to the collection of non-fungible tokens. The operations of block 1215 may be performed in accordance with examples as disclosed herein. In some examples, aspects of the operations of 1215 may be performed by a data reception manager 1035 as described with reference to FIG. 10.

At 1220, the method may include uploading at least a portion of the data corresponding to the collection of non-fungible tokens to a distributed file system. The operations of block 1220 may be performed in accordance with examples as disclosed herein. In some examples, aspects of the operations of 1220 may be performed by a data upload manager 1040 as described with reference to FIG. 10.

At 1225, the method may include uploading first content for a first non-fungible token to the distributed file system. The operations of block 1225 may be performed in accordance with examples as disclosed herein. In some examples, aspects of the operations of 1225 may be performed by a content upload manager 1045 as described with reference to FIG. 10.

At 1230, the method may include uploading second content for a second non-fungible token to the distributed file system. The operations of block 1230 may be performed in accordance with examples as disclosed herein. In some examples, aspects of the operations of 1230 may be performed by a content upload manager 1045 as described with reference to FIG. 10.

At 1235, the method may include receiving an update to the first content for the first non-fungible token of the collection of non-fungible tokens. The operations of block 1235 may be performed in accordance with examples as disclosed herein. In some examples, aspects of the operations of 1235 may be performed by a content upload manager 1045 as described with reference to FIG. 10.

At 1240, the method may include uploading, after receiving the update, updated first content to the distributed file system. The operations of block 1240 may be performed in accordance with examples as disclosed herein. In some examples, aspects of the operations of 1240 may be performed by a content upload manager 1045 as described with reference to FIG. 10.

At 1245, the method may include updating the smart contract stored on the blockchain distributed data store to include one or more indications of at least the portion of the data corresponding to the collection of non-fungible tokens and one or more indications of the updated first content. The operations of block 1245 may be performed in accordance with examples as disclosed herein. In some examples, aspects of the operations of 1245 may be performed by a smart contract manager 1030 as described with reference to FIG. 10.

FIG. 13 shows a flowchart illustrating a method 1300 that supports staging of non-fungible tokens before deployment in accordance with aspects of the present disclosure. The operations of the method 1300 may be implemented by a custodial token platform or its components as described herein. For example, the operations of the method 1300 may be performed by a custodial token platform as described with reference to FIGS. 1 through 11. In some examples, a custodial token platform may execute a set of instructions to control the functional elements of the custodial token platform to perform the described functions. Additionally, or alternatively, the custodial token platform may perform aspects of the described functions using special-purpose hardware.

At 1305, the method may include receiving one or more user inputs corresponding to a collection of non-fungible tokens associated with a smart contract to be stored on a blockchain distributed data store. The operations of block 1305 may be performed in accordance with examples as disclosed herein. In some examples, aspects of the operations of 1305 may be performed by an input manager 1025 as described with reference to FIG. 10.

At 1310 the method may include receiving an indication of a selection of a minting procedure, an indication of one or more contract addresses for receiving royalties or minting revenue, an indication of a collection type, a start date for minting, a mint price, a maximum mint quantity per transaction, or a combination thereof. The operations of block 1310 may be performed in accordance with examples as disclosed herein. In some examples, aspects of the operations of 1310 may be performed by a minting procedure manager 1050 as described with reference to FIG. 10.

At 1315, the method may include deploying the smart contract to the blockchain distributed data store based on the one or more user inputs. The operations of block 1315 may be performed in accordance with examples as disclosed herein. In some examples, aspects of the operations of 1315 may be performed by a smart contract manager 1030 as described with reference to FIG. 10.

At 1320, the method may include receiving data corresponding to the collection of non-fungible tokens. The operations of block 1320 may be performed in accordance with examples as disclosed herein. In some examples, aspects of the operations of 1320 may be performed by a data reception manager 1035 as described with reference to FIG. 10.

At 1325, the method may include uploading at least a portion of the data corresponding to the collection of non-fungible tokens to a distributed file system, wherein uploading at least the portion of the data corresponding to the collection of non-fungible tokens comprises. The operations of block 1325 may be performed in accordance with examples as disclosed herein. In some examples, aspects of the operations of 1325 may be performed by a data upload manager 1040 as described with reference to FIG. 10.

At 1330, the method may include uploading first content for a first non-fungible token to the distributed file system. The operations of block 1330 may be performed in accordance with examples as disclosed herein. In some examples, aspects of the operations of 1330 may be performed by a content upload manager 1045 as described with reference to FIG. 10.

At 1335, the method may include uploading second content for a second non-fungible token to the distributed file system. The operations of block 1335 may be performed in accordance with examples as disclosed herein. In some examples, aspects of the operations of 1335 may be performed by a content upload manager 1045 as described with reference to FIG. 10.

At 1340, the method may include receiving an update to the first content for the first non-fungible token of the collection of non-fungible tokens. The operations of block 1340 may be performed in accordance with examples as disclosed herein. In some examples, aspects of the operations of 1340 may be performed by a content upload manager 1045 as described with reference to FIG. 10.

At 1345, the method may include uploading, after receiving the update, updated first content to the distributed file system. The operations of block 1345 may be performed in accordance with examples as disclosed herein. In some examples, aspects of the operations of 1345 may be performed by a content upload manager 1045 as described with reference to FIG. 10.

At 1350, the method may include updating the smart contract stored on the blockchain distributed data store to include one or more indications of at least the portion of the data corresponding to the collection of non-fungible tokens and one or more indications of the updated first content. The operations of block 1350 may be performed in accordance with examples as disclosed herein. In some examples, aspects of the operations of 1350 may be performed by a smart contract manager 1030 as described with reference to FIG. 10.

Figure 14:
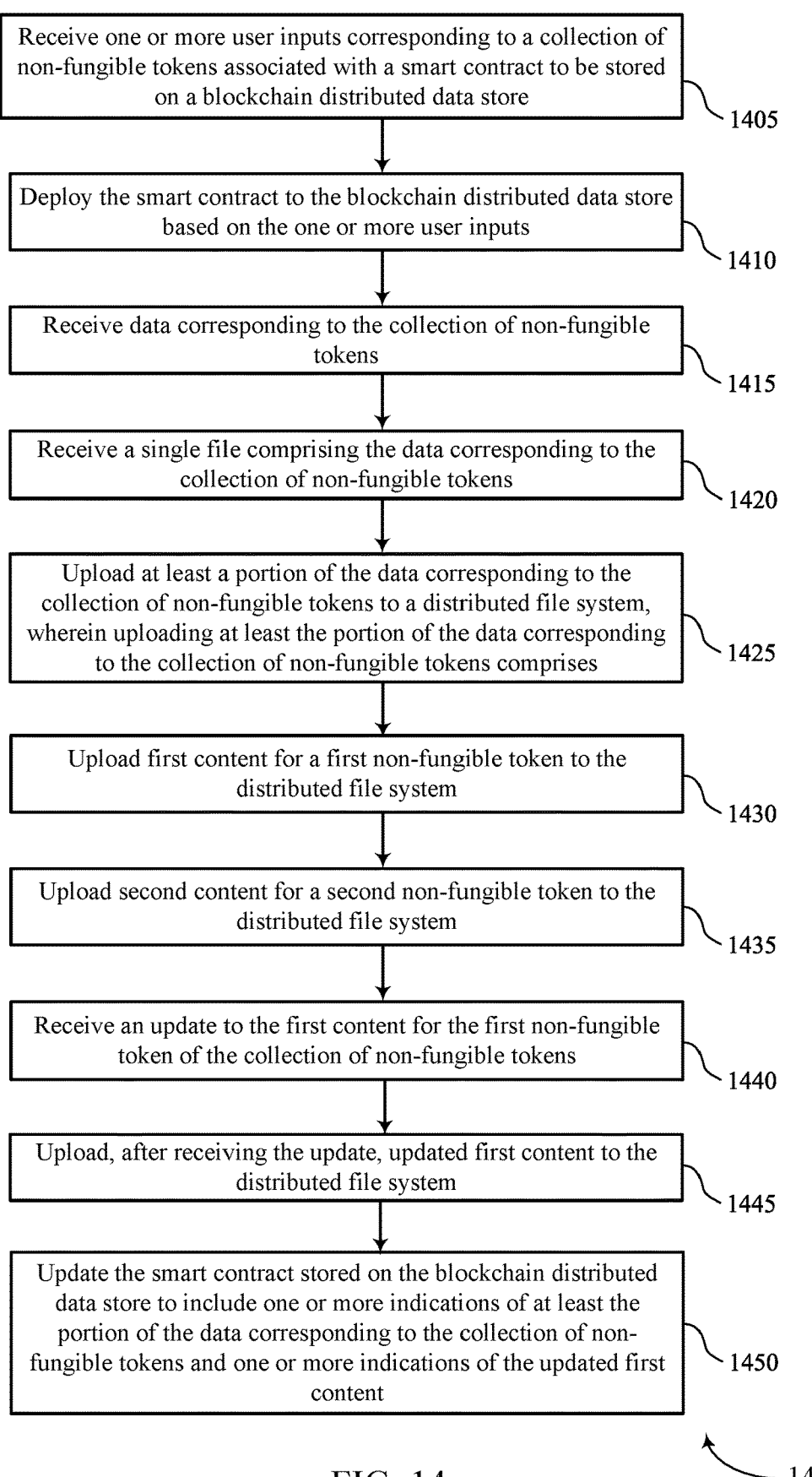

FIG. 14 shows a flowchart illustrating a method 1400 that supports staging of non-fungible tokens before deployment in accordance with aspects of the present disclosure. The operations of the method 1400 may be implemented by a custodial token platform or its components as described herein. For example, the operations of the method 1400 may be performed by a custodial token platform as described with reference to FIGS. 1 through 11. In some examples, a custodial token platform may execute a set of instructions to control the functional elements of the custodial token platform to perform the described functions. Additionally, or alternatively, the custodial token platform may perform aspects of the described functions using special-purpose hardware.

At 1405, the method may include receiving one or more user inputs corresponding to a collection of non-fungible tokens associated with a smart contract to be stored on a blockchain distributed data store. The operations of block 1405 may be performed in accordance with examples as disclosed herein. In some examples, aspects of the operations of 1405 may be performed by an input manager 1025 as described with reference to FIG. 10.

At 1410, the method may include deploying the smart contract to the blockchain distributed data store based on the one or more user inputs. The operations of block 1410 may be performed in accordance with examples as disclosed herein. In some examples, aspects of the operations of 1410 may be performed by a smart contract manager 1030 as described with reference to FIG. 10.

At 1415, the method may include receiving data corresponding to the collection of non-fungible tokens. The operations of block 1415 may be performed in accordance with examples as disclosed herein. In some examples, aspects of the operations of 1415 may be performed by a data reception manager 1035 as described with reference to FIG. 10.

At 1420, the method may include receiving a single file comprising the data (e.g., receiving the data at 1415) corresponding to the collection of non-fungible tokens. The operations of block 1420 may be performed in accordance with examples as disclosed herein. In some examples, aspects of the operations of 1420 may be performed by a data reception manager 1035 as described with reference to FIG. 10.

At 1425, the method may include uploading at least a portion of the data corresponding to the collection of non-fungible tokens to a distributed file system, wherein uploading at least the portion of the data corresponding to the collection of non-fungible tokens comprises. The operations of block 1425 may be performed in accordance with examples as disclosed herein. In some examples, aspects of the operations of 1425 may be performed by a data upload manager 1040 as described with reference to FIG. 10.

At 1430, the method may include uploading first content for a first non-fungible token to the distributed file system. The operations of block 1430 may be performed in accordance with examples as disclosed herein. In some examples, aspects of the operations of 1430 may be performed by a content upload manager 1045 as described with reference to FIG. 10.

At 1435, the method may include uploading second content for a second non-fungible token to the distributed file system. The operations of block 1435 may be performed in accordance with examples as disclosed herein. In some examples, aspects of the operations of 1435 may be performed by a content upload manager 1045 as described with reference to FIG. 10.

At 1440, the method may include receiving an update to the first content for the first non-fungible token of the collection of non-fungible tokens. The operations of block 1440 may be performed in accordance with examples as disclosed herein. In some examples, aspects of the operations of 1440 may be performed by a content upload manager 1045 as described with reference to FIG. 10.

At 1445, the method may include uploading, after receiving the update, updated first content to the distributed file system. The operations of block 1445 may be performed in accordance with examples as disclosed herein. In some examples, aspects of the operations of 1445 may be performed by a content upload manager 1045 as described with reference to FIG. 10.

At 1450, the method may include updating the smart contract stored on the blockchain distributed data store to include one or more indications of at least the portion of the data corresponding to the collection of non-fungible tokens and one or more indications of the updated first content. The operations of block 1450 may be performed in accordance with examples as disclosed herein. In some examples, aspects of the operations of 1450 may be performed by a smart contract manager 1030 as described with reference to FIG. 10.

A method for modifying NFTs is described. The method may include receiving one or more user inputs corresponding to a collection of NFTs associated with a smart contract to be stored on a blockchain distributed data store, deploying the smart contract to the blockchain distributed data store based on the one or more user inputs, receiving data corresponding to the collection of NFTs, uploading at least a portion of the data corresponding to the collection of NFTs to a distributed file system, wherein uploading at least the portion of the data corresponding to the collection of NFTs comprises, uploading first content for a first non-fungible token to the distributed file system, uploading second content for a second non-fungible token to the distributed file system, receiving an update to the first content for the first non-fungible token of the collection of NFTs, uploading, after receiving the update, updated first content to the distributed file system, and updating the smart contract stored on the blockchain distributed data store to include one or more indications of at least the portion of the data corresponding to the collection of NFTs and one or more indications of the updated first content.

An apparatus for modifying NFTs is described. The apparatus may include at least one processor, at least one memory coupled with the at least one processor, and instructions stored in the at least one memory. The instructions may be executable by the at least one processor to cause the apparatus to receive one or more user inputs corresponding to a collection of NFTs associated with a smart contract to be stored on a blockchain distributed data store, deploy the smart contract to the blockchain distributed data store based on the one or more user inputs, receive data corresponding to the collection of NFTs, upload at least a portion of the data corresponding to the collection of NFTs to a distributed file system, wherein uploading at least the portion of the data corresponding to the collection of NFTs comprises, upload first content for a first non-fungible token to the distributed file system, upload second content for a second non-fungible token to the distributed file system, receive an update to the first content for the first non-fungible token of the collection of NFTs, uploading, after receiving the update, updated first content to the distributed file system, and update the smart contract stored on the blockchain distributed data store to include one or more indications of at least the portion of the data corresponding to the collection of NFTs and one or more indications of the updated first content.

Another apparatus for modifying NFTs is described. The apparatus may include means for receiving one or more user inputs corresponding to a collection of NFTs associated with a smart contract to be stored on a blockchain distributed data store, means for deploying the smart contract to the blockchain distributed data store based on the one or more user inputs, means for receiving data corresponding to the collection of NFTs, means for uploading at least a portion of the data corresponding to the collection of NFTs to a distributed file system, wherein uploading at least the portion of the data corresponding to the collection of NFTs comprises, means for uploading first content for a first non-fungible token to the distributed file system, means for uploading second content for a second non-fungible token to the distributed file system, means for receiving an update to the first content for the first non-fungible token of the collection of NFTs, means for uploading, after receiving the update, updated first content to the distributed file system, and means for updating the smart contract stored on the blockchain distributed data store to include one or more indications of at least the portion of the data corresponding to the collection of NFTs and one or more indications of the updated first content.

A non-transitory computer-readable medium storing code for modifying NFTs is described. The code may include instructions executable by at least one processor to receive one or more user inputs corresponding to a collection of NFTs associated with a smart contract to be stored on a blockchain distributed data store, deploy the smart contract to the blockchain distributed data store based on the one or more user inputs, receive data corresponding to the collection of NFTs, upload at least a portion of the data corresponding to the collection of NFTs to a distributed file system, wherein uploading at least the portion of the data corresponding to the collection of NFTs comprises, upload first content for a first non-fungible token to the distributed file system, upload second content for a second non-fungible token to the distributed file system, receive an update to the first content for the first non-fungible token of the collection of NFTs, uploading, after receiving the update, updated first content to the distributed file system, and update the smart contract stored on the blockchain distributed data store to include one or more indications of at least the portion of the data corresponding to the collection of NFTs and one or more indications of the updated first content.

In some examples of the method, apparatuses, and non-transitory computer-readable medium described herein, receiving the one or more user inputs may include operations, features, means, or instructions for receiving an indication of a selection of a minting procedure, an indication of one or more contract addresses for receiving royalties or minting revenue, an indication of a collection type, a start date for minting, a mint price, a maximum mint quantity per transaction, or a combination thereof.

In some examples of the method, apparatuses, and non-transitory computer-readable medium described herein, receiving the data may include operations, features, means, or instructions for receiving a single file comprising the data corresponding to the collection of NFTs.

Some examples of the method, apparatuses, and non-transitory computer-readable medium described herein may further include operations, features, means, or instructions for receiving a plurality of individual inputs of data corresponding to the collection of NFTs.

In some examples of the method, apparatuses, and non-transitory computer-readable medium described herein, receiving the update to the first content may include operations, features, means, or instructions for receiving a modification of the first content of at least one non-fungible token of the collection of NFTs.

In some examples of the method, apparatuses, and non-transitory computer-readable medium described herein, uploading at least the portion of the data may include operations, features, means, or instructions for uploading, to the distributed file system and via a background process, a set of data for one or more NFTs of the collection of NFTs.

In some examples of the method, apparatuses, and non-transitory computer-readable medium described herein, the data corresponding to the collection of NFTs may be received at a non-fungible token marketplace, a custodial token platform, or both.

Some examples of the method, apparatuses, and non-transitory computer-readable medium described herein may further include operations, features, means, or instructions for receiving, from a client associated with a wallet address, a request to mint a non-fungible token of the collection of NFTs, transmitting, to the client, a transaction that is configured to mint the non-fungible token, and detecting, via the blockchain distributed data store, a message that includes the payload, the message is signed by a private key associated with the wallet address and results in the non-fungible token being transferred to the wallet address.

In some examples of the method, apparatuses, and non-transitory computer-readable medium described herein, the first content, the second content, or both comprises metadata, image data, audio data, or a combination thereof.

Some examples of the method, apparatuses, and non-transitory computer-readable medium described herein may further include operations, features, means, or instructions for generating, after uploading at least the portion of the data corresponding to the collection of NFTs to the distributed file system, database entries that correspond to the collection of NFTs, the database entries including: a first entry corresponding to the first non-fungible token and including at least a first link to the first content, and a second entry corresponding to the second non-fungible token and including at least a second link to the second content.

In some examples of the method, apparatuses, and non-transitory computer-readable medium described herein, each entry of the database entries comprises a token identifier for a non-fungible token, a contract identifier associated with the smart contract, and one or more links to content of the non-fungible token stored in the distributed file system and the contract identifier may be a contract address.

In some examples of the method, apparatuses, and non-transitory computer-readable medium described herein, uploading, after receiving the update, updated first content to the distributed file system and updating the first entry to include a new first link to the updated first content, wherein the smart contract may be updated to include information from the first entry.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for modifying non-fungible tokens, comprising:
   receiving one or more user inputs corresponding to a collection of non-fungible tokens associated with a smart contract to be stored on a blockchain distributed data store, wherein the one or more user inputs comprise scheduling information for releasing the collection of non-fungible tokens, the scheduling information including at least a start date for minting;
   deploying the smart contract to the blockchain distributed data store based on the one or more user inputs;
   receiving data corresponding to the collection of non-fungible tokens;
   uploading, as part of a first background process, at least a portion of the data corresponding to the collection of non-fungible tokens to a distributed file system, wherein uploading at least the portion of the data corresponding to the collection of non-fungible tokens comprises:
      uploading first content for a first non-fungible token to the distributed file system; and
      uploading second content for a second non-fungible token to the distributed file system;
   receiving an update to the first content for the first non-fungible token of the collection of non-fungible tokens;
   uploading, after receiving the update and as part of a second background process, updated first content to the distributed file system;
   transmitting, via a blockchain, one or more messages to update the smart contract stored on the blockchain distributed data store to include one or more indications of at least the portion of the data uploaded to the distributed file system and corresponding to the collection of non-fungible tokens and one or more indications of the updated first content;
   receiving, from a client associated with a wallet address, a request to mint a non-fungible token of the collection of non-fungible tokens;
   transmitting, to the client, a transaction that is configured to mint the non-fungible token; and
   detecting, via the blockchain distributed data store, a message that includes a payload, wherein the message is signed by a private key associated with the wallet address and results in the non-fungible token being transferred to the wallet address.

2. The method of claim 1, wherein receiving the one or more user inputs further comprises:
   receiving an indication of a selection of a minting procedure, an indication of one or more contract addresses for receiving royalties or minting revenue, an indication of a collection type, a mint price, a maximum mint quantity per transaction, or a combination thereof.

3. The method of claim 1, wherein receiving the data comprises:

receiving a single file comprising the data corresponding to the collection of non-fungible tokens.

4. The method of claim 1, wherein receiving the data comprises:

receiving a plurality of individual inputs of data corresponding to the collection of non-fungible tokens.

5. The method of claim 1, wherein receiving the update to the first content comprises:

receiving a modification of the first content of at least one non-fungible token of the collection of non-fungible tokens.

6. The method of claim 1, wherein uploading at least the portion of the data comprises:

uploading, to the distributed file system and via the first background process, a set of data for one or more non-fungible tokens of the collection of non-fungible tokens.

7. The method of claim 1, wherein the data corresponding to the collection of non-fungible tokens is received at a non-fungible token marketplace, a custodial token platform, or both.

8. The method of claim 1, wherein the first content, the second content, or both comprises metadata, image data, audio data, or a combination thereof.

9. The method of claim 1, further comprising:

generating, after uploading at least the portion of the data corresponding to the collection of non-fungible tokens to the distributed file system, database entries that correspond to the collection of non-fungible tokens, the database entries including:

a first entry corresponding to the first non-fungible token and including at least a first link to the first content, and a second entry corresponding to the second non-fungible token and including at least a second link to the second content.

10. The method of claim 9, wherein:

each entry of the database entries comprises a token identifier for a non-fungible token, a contract identifier associated with the smart contract, and one or more links to content of the non-fungible token stored in the distributed file system, and the contract identifier is a contract address.

11. The method of claim 9, further comprising:

updating, after uploading the updated first content, the first entry to include a new first link to the updated first content, wherein the smart contract is updated to include information from the first entry.

12. An apparatus for modifying non-fungible tokens, comprising:

at least one processor;

at least one memory coupled with the at least one processor; and instructions stored in the at least one memory and executable by the at least one processor to cause the apparatus to:

receive one or more user inputs corresponding to a collection of non-fungible tokens associated with a smart contract to be stored on a blockchain distributed data store wherein the one or more user inputs comprise scheduling information for releasing the collection of non-fungible tokens, the scheduling information including at least a start date for minting;

deploy the smart contract to the blockchain distributed data store based on the one or more user inputs;

receive data corresponding to the collection of non-fungible tokens;

upload, as part of a first background process, at least a portion of the data corresponding to the collection of non-fungible tokens to a distributed file system, wherein uploading at least the portion of the data corresponding to the collection of non-fungible tokens comprises:

uploading first content for a first non-fungible token to the distributed file system; and uploading second content for a second non-fungible token to the distributed file system;

receive an update to the first content for the first non-fungible token of the collection of non-fungible tokens;

upload, after receiving the update and as part of a second background process, updated first content to the distributed file system;

transmit, via a blockchain, one or more messages to update the smart contract stored on the blockchain distributed data store to include one or more indications of at least the portion of the data uploaded to the distributed file system and corresponding to the collection of non-fungible tokens and one or more indications of the updated first content;

receive, from a client associated with a wallet address, a request to mint a non-fungible token of the collection of non-fungible tokens;

transmit, to the client, a transaction that is configured to mint the non-fungible token; and detect, via the blockchain distributed data store, a message that includes a payload, wherein the message is signed by a private key associated with the wallet address and results in the non-fungible token being transferred to the wallet address.

13. The apparatus of claim 12, wherein the instructions to receive the one or more user inputs are executable by the at least one processor to cause the apparatus to:

receive an indication of a selection of a minting procedure, an indication of one or more contract addresses for receiving royalties or minting revenue, an indication of a collection type, a mint price, a maximum mint quantity per transaction, or a combination thereof.

14. The apparatus of claim 12, wherein the instructions to receive the data are executable by the at least one processor to cause the apparatus to:

receive a single file comprising the data corresponding to the collection of non-fungible tokens.

15. The apparatus of claim 12, wherein the instructions to receive the data are executable by the at least one processor to cause the apparatus to:

receive a plurality of individual inputs of data corresponding to the collection of non-fungible tokens.

16. The apparatus of claim 12, wherein the instructions to receive the update to the first content are executable by the at least one processor to cause the apparatus to:

receive a modification of the first content of at least one non-fungible token of the collection of non-fungible tokens.

17. A non-transitory computer-readable medium storing code for modifying non-fungible tokens, the code comprising instructions executable by at least one processor to:

receive one or more user inputs corresponding to a collection of non-fungible tokens associated with a smart contract to be stored on a blockchain distributed data store wherein the one or more user inputs comprise scheduling information for releasing the collection of non-fungible tokens, the scheduling information including at least a start date for minting;

deploy the smart contract to the blockchain distributed data store based on the one or more user inputs;

receive data corresponding to the collection of non-fungible tokens;

upload, as part of a first background process, at least a portion of the data corresponding to the collection of non-fungible tokens to a distributed file system, wherein uploading at least the portion of the data corresponding to the collection of non-fungible tokens comprises:

upload first content for a first non-fungible token to the distributed file system; and upload second content for a second non-fungible token to the distributed file system;

receive an update to the first content for the first non-fungible token of the collection of non-fungible tokens;

upload, after receiving the update and as part of a second background process, updated first content to the distributed file system;

transmit, via a blockchain, one or more messages to update the smart contract stored on the blockchain distributed data store to include one or more indications of at least the portion of the data uploaded to the distributed file system and corresponding to the collection of non-fungible tokens and one or more indications of the updated first content;

receive, from a client associated with a wallet address, a request to mint a non-fungible token of the collection of non-fungible tokens;

transmit, to the client, a transaction that is configured to mint the non-fungible token; and detect, via the blockchain distributed data store, a message that includes a payload, wherein the message is signed by a private key associated with the wallet address and results in the non-fungible token being transferred to the wallet address.

18. The non-transitory computer-readable medium of claim 17, wherein the instructions for uploading at least the portion of the data are executable by the at least one processor to:

upload, to the distributed file system and via the first background process, a set of data for one or more non-fungible tokens of the collection of non-fungible tokens.

19. The non-transitory computer-readable medium of claim 17, wherein the data corresponding to the collection of non-fungible tokens is received at a non-fungible token marketplace, a custodial token platform, or both.

* * * * *